United States Patent
Karim et al.

(10) Patent No.: US 11,938,696 B2
(45) Date of Patent: Mar. 26, 2024

(54) METHOD FOR MANUFACTURING A COATED LENS

(71) Applicant: Carl Zeiss Vision International GmbH, Aalen (DE)

(72) Inventors: Waiz Karim, Ellwangen (DE); Andreu Llobera Adan, Barcelona (ES); Emad Flear Aziz, Aalen (DE); Norbert Hugenberg, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/145,182

(22) Filed: Dec. 22, 2022

(65) Prior Publication Data

US 2023/0126044 A1  Apr. 27, 2023

Related U.S. Application Data

(63) Continuation of application No. PCT/EP2021/067548, filed on Jun. 25, 2021.

(30) Foreign Application Priority Data

Jun. 26, 2020 (EP) .................................... 20182515

(51) Int. Cl.
*G02B 1/14* (2015.01)
*B29D 11/00* (2006.01)

(52) U.S. Cl.
CPC .. *B29D 11/00865* (2013.01); *B29D 11/00442* (2013.01); *G02B 1/14* (2015.01)

(58) Field of Classification Search
CPC ................ G02B 1/14; B29D 11/00442; B29D 11/00865
See application file for complete search history.

(56) References Cited

U.S. PATENT DOCUMENTS

| | | | |
|---|---|---|---|
| 5,316,791 A * | 5/1994 | Farber | C08J 7/046 427/164 |
| 5,366,545 A | 11/1994 | Yajima et al. | |
| 6,086,799 A | 7/2000 | Buazza et al. | |
| 6,187,444 B1 | 2/2001 | Bowles et al. | |
| 8,252,368 B2 | 8/2012 | Lacan et al. | |
| 9,778,484 B2 | 10/2017 | Faul et al. | |
| 9,957,398 B2 | 5/2018 | Hugenberg et al. | |
| 2002/0158354 A1 | 10/2002 | Foreman et al. | |
| 2004/0156983 A1 | 8/2004 | Moravec et al. | |
| 2006/0065989 A1* | 3/2006 | Druffel | B29D 11/00009 264/1.32 |
| 2013/0274381 A1* | 10/2013 | Hugenberg | C08G 77/14 427/386 |
| 2020/0199372 A1* | 6/2020 | Egawa | C09D 4/06 |

FOREIGN PATENT DOCUMENTS

| | | |
|---|---|---|
| DE | 19848591 A1 | 10/1999 |
| EP | 1392613 A1 | 3/2004 |
| EP | 1433814 A1 | 6/2004 |
| EP | 1561571 A1 | 8/2005 |
| EP | 1602479 A1 | 12/2005 |
| EP | 2437084 A1 | 4/2012 |
| EP | 2578649 A1 | 4/2013 |
| EP | 2801846 A1 | 11/2014 |
| WO | 9417116 A1 | 8/1994 |
| WO | 9417166 A1 | 8/1994 |
| WO | 9739880 A2 | 10/1997 |
| WO | 9906887 A1 | 2/1999 |
| WO | 0018569 A2 | 4/2000 |
| WO | 0056527 A1 | 9/2000 |
| WO | 0194104 A2 | 12/2001 |
| WO | 03078145 A2 | 9/2003 |
| WO | 2006015328 A2 | 2/2006 |
| WO | 2006135390 A2 | 12/2006 |
| WO | 2010005609 A1 | 1/2010 |
| WO | 2011127335 A1 | 10/2011 |
| WO | 2011153357 A1 | 12/2011 |
| WO | 2012138516 A1 | 10/2012 |
| WO | 2013025756 A2 | 2/2013 |
| WO | 2017160288 A1 | 9/2017 |

OTHER PUBLICATIONS

US 9,720,143 B2, 08/2017, Neuffer (withdrawn)
"Ophthalmic optics—Spectacle lenses—Vocabulary" (DIN EN ISO 13666:2019-12); third edition Feb. 2019.
International Search Report and Written Opinion issued in PCT/EP2021/067548, which is a counterpart hereof, dated Sep. 24, 2021.
International Preliminary Examination Report issued in PCT/EP2021/067548, which is a counterpart hereof, dated Oct. 17, 2022.

* cited by examiner

*Primary Examiner* — Elizabeth A Burkhart
(74) *Attorney, Agent, or Firm* — Tautz & Schuhmacher LLC; Georg M. Hasselmann

(57) ABSTRACT

A method for manufacturing a coated lens by applying at least one single electromagnetic pulse to convert a coating precursor material into at least one coating. The electromagnetic pulse is delivered to the coating precursor material applied on a surface of an uncoated or precoated optical lens substrate. The at least one single electromagnetic pulse is applied from an electromagnetic source such as a flash lamp, a halogen lamp, a directed plasma arc, a laser, a microwave generator, an induction heater, an electron beam, a stroboscope, or a mercury lamp.

25 Claims, No Drawings

METHOD FOR MANUFACTURING A COATED LENS

CROSS REFERENCE TO RELATED APPLICATIONS

This application is a continuation application of international patent application PCT/EP2021/067548, filed on Jun. 25, 2021, designating the United States and claiming priority from European patent application EP 20 182 515.5, filed on Jun. 26, 2020, both of which are hereby incorporated by reference in their entireties.

TECHNICAL FIELD

The disclosure is directed to a method for manufacturing a coated lens comprising an uncoated or precoated optical lens substrate and at least one coating precursor material.

BACKGROUND

A spectacle lens generally comprises an optical lens substrate and at least one coating applied to at least one of the surfaces of the optical lens substrate. The at least one coating enhances the durability and/or improves the performance of the spectacle lens. The optical lens substrate can be made of mineral glass and/or of an organic hard resin such as a thermosetting hard resin according to section 3.3.3 of DIN EN ISO 13666:2019-12, a thermoplastic hard resin according to 3.3.4 of DIN EN ISO 13666:2019-12, or a photochromic material according to section 3.3.5 of DIN EN ISO 13666:2019-12. The spectacle lens can be, for example, according to section 3.6.3 of DIN EN ISO 13666:2019-12 a plano lens or according to section 3.5 of DIN EN ISO 13666:2019-12, a corrective lens (section 3.5.1), a protective lens (section 3.5.4), an absorptive lens (section 3.5.5), a tinted lens (section 3.5.6), a clear lens (section 3.5.7), a uniformly tinted lens (section 3.5.8), a gradient-tinted lens (section 3.5.9), a photochromic lens (section 3.5.11) or a polarizing lens (section 3.5.12).

In order to improve the durability and performance of a spectacle lens or to alter at least one property of the spectacle lens, the optical lens substrate may be provided with at least one coating according to section 3.18 of DIN EN ISO 13666:2019-12, such as a hard coating (section 3.18.2), an anti-reflective coating (section 3.18.3), a clean coating (section 3.18.4), a hydrophobic coating (section 3.18.5), a hydrophilic coating (section 3.18.6), an anti-fog coating (section 3.18.7) or an anti-static coating (section 3.18.8). The spectacle lenses with at least one of the above-mentioned coatings are called "coated lenses" henceforth, in accordance with section 3.18.1 of DIN EN ISO 13666:2019-12.

The coating precursor materials of the above-mentioned coatings can be applied to an optical lens substrate by several coating methods such as, for example, dip-coating, spin-coating, spray coating, atomic layer deposition or physical vapour deposition, optionally followed by a drying step and a hardening step and/or a sintering step and/or a curing step.

Following the application of at least one coating precursor material on at least one surface of the optical lens substrate or on at least one surface of a coated lens, the at least one coating precursor material is to be converted to at least one coating. This conversion is usually done by applying a thermal treatment to dry and to sinter and/or to harden and/or to cure the coating precursor material and so to obtain the coating. In particular, when coating at least one surface of an optical lens substrate or at least one surface of a coated lens each comprising an organic hard resin as substrate, utmost care must be taken not to increase the temperature above the glass transition temperature of the optical lens substrate or above the temperature at which the optical lens substrate or the coated lens each starts losing the desired optical, mechanical, functional and/or chemical properties (hereafter called 'threshold temperature'). An increase of the temperature of the optical lens substrate or of the coated lens above this threshold temperature leads to a deterioration of the optical, mechanical, functional and/or chemical properties of the optical lens substrate or of the coated lens. For example, if the optical lens substrate is deformed when heating above the threshold temperature, at least the optical properties are usually impaired.

With respect to conventional thermal curing, done by direct application of heat e.g., in ovens or furnaces, one possibility is to apply mild baking conditions at low temperatures wherein the at least one coating precursor material is dried and cured and/or hardened and/or sintered at a temperature which is maintained below the threshold temperature of the optical lens substrate, below the threshold temperature of the coated lens and/or below the threshold temperature of the coating precursor material. The threshold temperature of the coating precursor material is the temperature at which the coating precursor material starts losing the desired optical, mechanical, functional and/or chemical properties. The disadvantage of this approach is that the time required to dry and cure and/or sinter and/or harden the respective coating precursor material on at least one surface of the optical lens substrate and/or on at least one surface of the coated lens is increased. Furthermore, as the threshold temperature differs from optical lens substrate to optical lens substrate or from coated lens to coated lens, the mild baking conditions may have to be adapted for each material of the optical lens substrate or for each coated lens. Another disadvantage is that a mild baking temperature results in a minor degree of densification and/or polymerisation and/or cross-linking of the at least one coating precursor material to be dried and sintered and/or cured and/or hardened, which in turn is insufficient and detrimental in achieving the resulting coating with the optimal mechanical properties and/or the optimal optical properties and/or the optimal functional properties and/or the optimal chemical properties.

Another approach when applying at least one coating precursor material to an optical lens substrate or to a coated lens is to carry out the drying and sintering and/or curing and/or hardening of the at least one coating precursor material by irradiation with UV light. This, however, is only possible if the respective coating precursor material is UV-sensitive, i.e., can be dried and hardened and/or sintered and/or cured by irradiation with UV light. In order not to increase the temperature of the optical lens substrate or the coated lens above its respective threshold temperature, the dose of the UV light used for irradiation of the at least one coating precursor material has to be adapted to avoid concomitant heating of the optical lens substrate or of the coated lens. Alternatively, a cooling method such as airflow to control the temperature during exposure can be used. A disadvantage of these approaches may be that the time to dry and harden and/or cure and/or sinter is prolonged and, thus, the throughput of the production process is significantly reduced, or that the coating is not fully dried and cured and/or sintered and/or hardened.

Although a UV curing method is faster than a thermal curing method, it is limited to UV-sensitive coating precursor materials. Furthermore, at least one photo-initiator usually has to be added in the UV-sensitive coating precursor material. The use of at least one photo-initiator may increase the production costs. Additionally, many common coating precursor materials are without photo-initiators and therefore can only be dried and cured and/or sintered and/or hardened by a thermal curing method. Further, these coating precursor materials cannot easily be converted to a UV-curable coating precursor material. The presence of at least one photo-initiator may also negatively affect the optical, chemical, functional and/or mechanical properties of the coating.

WO 2011/153357 A1 discloses a pulsed radiation thermal processing technique to thermally process a thin film on a substrate. As, according to WO 2011/153357 A1, page 5, lines 14 to 17, it is quite difficult to thermally process a very thin film and/or a somewhat transparent film directly with the pulsed thermal processing technique because the very thin film absorbs minimal radiation, WO 2011/153357 A1 suggests depositing an absorbing trace on top of the very thin film. The absorbing trace is heated before the very thin film and the shaded area within the very thin film and the typically, high-temperature substrate located underneath and adjacent to the absorbing trace are thermally processed by the heated absorbing trace. The absorbing traces are typically, made of a material that is more absorptive of pulsed radiation than the very thin film. In case of a low-temperature substrate, the thermal processing of very thin films may be performed by applying heat spreading films before or after the application of the absorbing traces. Since the thermal conductivity of the heat spreading film is higher than that of the low temperature substrate, heat is preferentially conducted in the plane of the very thin film and the heat spreading film instead of the low temperature substrate after absorbing traces have been heated.

WO 2012/138516 A1 discloses a method for thermally processing thin films located on substrates having a lower maximum working temperature by using light pulses from a flashlamp, this method allowing not to extend the processing time. According to WO 2012/138516 A1 a thin film stack is thermally processed by conveying the thin film stack past a flashlamp during which the thin film stack is irradiated with a composite light pulse composed of multiple micropulses from the flashlamp. With the method disclosed, a thin film can be processed at a significantly higher temperature than the maximum working temperature of the substrate for processing times shorter than the thermal equilibration time of the thin film stack. Therefore, the temperature the thin film attains after thermal equilibrium needs to be lower than the maximum working temperature of the substrate. The method may be utilized for example to dry and sinter a nano silver ink on a PET substrate or to form a film of conductive copper metal on a PET sheet upon curing an aqueous copper precursor ink.

WO 2011/127335 A1 discloses to transiently and thermally process a thin film on a low-temperature substrate with pulsed light and an apparatus for this process. The thermal profile, i.e., the temperature of a thin film stack is to be controlled in time and space. According to WO 2011/127335 A1, when thermally processing material on a thermally fragile substrate a better cure can be attained when the curing is intense and transient rather than continuous equilibrium processes. The material to be thermally processed is an absorber, for example a metal ink is sintered to form a conductor.

WO 2010/005609 A1 discloses a method for curing thin films on substrates at low temperatures by combining a rapid pulse train with a moving substrate. A uniform cure is attained over an arbitrarily large area as each section of thin film is exposed to multiple pulses, which approximates a continuous curing system such as an oven. As the heating of the thin film is limited by the decomposition temperature of substrate at the interface to the thin film, WO 2010/005609 A1 suggests placing a layer of thermal barrier material with a higher temperature of decomposition and a lower thermal conductivity than the substrate between the thin film and the substrate. The usage of the thermal barrier layer enables a higher power irradiation and a slightly higher total energy, which results in a pulse having a shorter pulse length. The method disclosed can be used to cure a printed silver nanoparticle aqueous-based ink.

WO 2017/160288 A1 discloses a method of transferring a functional material from a donor substrate onto a receiving substrate. As donor substrate an optically transparent plate having a first surface and a second surface with one or more wells is used. After having the second surface coated with a thin layer of light-absorbing material and after having the wells filled with a functional material, the donor substrate is irradiated with a pulsed light. The layer of light-absorbing material is heated to generate a gas at an interface between the layer of light-absorbing material and the functional material to release the functional material from the wells onto the receiving substrate. The first surface of the donor substrate is flat but may be curved. The higher the thermal diffusivity of the donor substrate and the light-absorbing material layer, the higher the intensity and the shorter the pulse length are required. The pulse of light is typically, less than 1 ms. Additional layers, such as a reflective layer, a thermal buffer layer or a release layer may be applied on the second surface of the donor substrate. In WO 2017/160288 A1 the curved surface is not the surface on which a coating precursor material is to be dried and cured and/or sintered and/or hardened.

WO 2013/025756 A2 discloses a two-step pulse lamp sintering method using a series of relatively low energy light pulses to pre-treat the target before applying one or more relatively higher energy pulses to sinter metallic nanoparticles. The partial sintering of the metallic nanoparticles is thus reduced or eliminated and a conductive ink including metallic nanoparticles obtains the desired conductivity.

WO 2006/015328 A2 discloses a method of thermally processing a functional material on a temperature-sensitive substrate by exposing the thin film to at least one incident pulse of infrared comprising radiation emitted from a directed plasma arc. The functional material may be a thin-film material usable as photovoltaic material.

US 2002/0158354 A1 discloses a method for making photochromic, ultraviolet/visible light absorbing, and colored plastic lenses by curing the lens forming composition using activating light. As activating light source an ultraviolet light source, an actinic light source, a visible light source and/or an infra-red light source may be used. The lens forming material may include any suitable liquid monomer and any suitable photosensitive initiator. The lens curing unit comprises a controller which inter alia determines the initial dose of light in pulsed curing applications required to cure the lens forming material, applies the activating light with an intensity and duration sufficient to equal the determined dose and calculates the dose required for the next application of activating light in pulsed curing applications. Instead of pulsed activated light curing sequences continuous activating light sequences may be used. In the latter case, equipment for generating light pulses is not required, thus reducing the cost of the lens curing apparatus.

WO 97/39880 A2 discloses the formation of an eyeglass lens by placing a liquid, polymerizable lens forming composition in a mold cavity, applying a plurality of high intensity light pulses to the lens forming composition and curing the lens forming composition to form a substantially clear eyeglass lens in a time period of less than 30 minutes. The pulses typically, emanating from a flash source of light, i.e., a flash light, such as a xenon light source, have a sufficiently high intensity such that reaction is initiated in substantially all the lens forming composition that is exposed to pulses in the mold cavity. According to WO 97/39880 A2, one advantage of pulsed light application via flashlights is that even though higher intensities of light are applied, because the duration of pulses is so short the total amount of light energy applied to cure the lens forming composition is lessened. According to WO 97/39880 A2, a further significant advantage is that relatively high-mass, semi-finished lens blanks and high power cast-to-finish lenses may be produced without prematurely releasing from the mold cavity and without cracking. By interrupting or decreasing the activating light at the proper time during the cycle, the rate of heat generation and release can be controlled, and the incidence of premature release can be reduced. According to WO 97/39880 A2, the curing of a lens forming composition comprising a photoinitiator absorbing ultraviolet light having a wavelength in the range of 300 to 400 nm is possible as well as the curing of a coating composition each curable upon exposure to UV light and each comprising a photoinitiator forming a substantially clear combination coat.

WO 00/18569 A2 discloses the curing of a polymerisable lens forming composition being placed in a mold/gasket assembly and continuously exposing the composition to pulsed activating light. A flash lamp, for example a xenon light source, may be used to emit the activating light pulses. Colored lenses, photochromic lenses, ultraviolet/light absorbing colorless lenses, and clear lenses may be formed, the latter by adding a colorless, non-photochromic ultraviolet/visible light absorbing compound to the lens forming composition. By adding the ultraviolet/visible light absorbers to the lens forming composition, the curing of the clear lens composition under the more intense dosing requirements to be used for the curing of a photochromic lens composition is possible. Moreover, the formed clear lenses may offer better protection against ultraviolet/visible light rays than a clear lens formed without such compounds. Further, WO 00/18569 A2 discloses an in-mold method for forming a scratch resistant coating or a tint coating over the lens. Alternatively, the lens may be tinted, or a scratch resistant coating may be applied to the lens after the lens has been demolded. The scratch resistant coating is then cured by applying activating light rays to this face of the lens. The lens forming composition as well as the coating may include a photosensitive initiator.

WO 2006/135390 A2 discloses the curing of a coating composition of a spectacle lens and of the uncoated spectacle each using pulses of activating light. The coatings such as hardcoat layers, antireflective coatings or photochromic coatings may be cured in an in-mold or in an out-of-mold process. Exemplarily, a spectacle lens comprising a hardcoat layer and an antireflective coating manufactured by an in-mold process is described, wherein the mold with the coatings was exposed to flashes from a strobe lamp.

WO 01/94104 A2 discloses the use of ultraviolet light curable liquid compositions for forming antireflective coatings on visible light transmitting spectacle lenses. The antireflective coatings may be formed in an-mold or in an out-of-mold process. A hardcoat composition may be applied prior to the application of the antireflective coating. The ultraviolet light may be produced by a flash lamp. Light pulses may be used to affect the curing of the coating compositions.

WO 03/078145 A2 discloses an in-mold process for manufacturing a coated spectacle lens. Therefore, the casting face of the front mold member may be coated with one or more hardcoat layers before the lens forming composition is placed within the mold cavity. If two hard coat layers are used, any imperfections, such as pin holes in the first hardcoat layer are covered by the second hardcoat layer. The spectacle lens may be further coated with an antireflective coating, either in an in-mold process or in an out-of-mold process. Activating light including ultraviolet light, actinic light, visible light, or infrared light may be applied to the coating composition to initiate curing of the coating composition. As activating light sources germicidal lamps, mercury vapor lamps, halide lamps and/or strobe lamps may be used. By using a strobe lamp as activation light source, less heat between process runs is produced, the activating light dosage may be controlled by controlling the intensity of light applied, the frequency of activating light flashes, the duration of activating light flashes and/or the number of activating light flashes. The lens forming material may include a photoinitiator that interacts with activating light.

WO 00/56527 A1 discloses a lens forming composition for making photochromic, ultraviolet/visible light absorbing colorless, and colored plastic lenses by curing the lens forming composition in an in-mold process with pulses of activating light. Activating light being able to affect a chemical change, e.g., to cause a polymerization to take place, may include ultraviolet light, actinic light, visible light, or infrared light. A flash lamp may be used to emit activating light pulses to cure the lens forming material or to cure a lens coating. By placing a liquid coating in the mold and subsequently curing it may result in a lens having a hard coat on a surface. The flash lamp may be a xenon light source. The relatively high intensity of the xenon flash lamp and short pulse duration may allow rapid curing of the lens forming composition without imparting significant radiative heat to the composition. The xenon flash lamp is used to apply a plurality of activating light pulses to the lens forming composition to cure it to an eyeglass lens in a time period of less than 30 minutes. Due to the relatively high intensity attainable with the xenon flash lamp a deeper penetration into and/or saturation of the lens forming composition may be allowed, thereby allowing uniform curing of thicker lenses than conventional radiation-initiated curing.

WO 99/06887 A1 discloses an in-mold process to form a spectacle lens by applying a plurality of activating light pulses to the lens forming composition. The pulses may emanate from a flash light such as a xenon light source. The flash lamp may also be used to cure a lens coating. WO 99/06887 A1 further discloses an in-mold process for forming a scratch resistant coating by placing a first coating composition within a mold member, distributing the first coating composition over the casting face of the mold member, directing activating light at the mold member to cure at least a portion of the first coating composition, placing a second coating composition within the mold, the first and the second coating composition comprising each a photoinitiator, distributing the second coating composition over the first coating composition, directing activating light at the mold member to cure at least a portion of the second coating composition and to form a substantially clear combination coat, assembling the mold member with a second mold member, placing a lens forming composition comprising a photoinitiator in the cavity and directing activating light at the mold to cure at least a portion of the lens forming material to form a coated spectacle lens. Alternatively, the spectacle lens may be demolded and then tinted, or a scratch resistant coating may be applied to the lens. The lens forming composition may contain activating light absorbing compounds such as photochromic pigments, the activating light absorbing compounds inhibiting ultraviolet light from being transmitted to the eye of a user wearing the spectacle lens.

The previously mentioned citations related to coated lenses disclose either an in-mold method or an out-of-mold method for curing a scratch resistant, photochromic or tinted coating precursor material on an optical lens substrate by using light pulses. The previously mentioned citations do not disclose a modification and/or an adjustment of the properties of the resulting coated lens. In addition, the total process duration for drying and curing and/or sintering and/or hardening at least one coating precursor material on at least one surface of an uncoated or precoated optical lens substrate, in which the optical lens substrate has already been dried and cured and/or sintered and/or hardened, has not been evoked.

US 2004/156983 A1 discloses a process to spin-apply a thermally curable, backside hard coating and to spin-apply a thermally curable, backside AR coating. The hard coating is precured using a combination of radiant and convective energy, for example exposure to a source of IR light for up to one minute ensures solvent flash off and precure to tack-free. The hard coating is final cured by thermal curing, typically, in a vapor curing oven. Example 1 of US 2004/156983 A1 describes the backside spin-coating of single vision polycarbonate lenses with a polyurethane primer and a siloxane hard coating. The final cure was effected in a vapor curing oven with a fluid for 8 minutes, instead of curing in a convention oven for 4 hours. A sol-gel AR coating system is applied to the resulting lenses. US 2004/156983 A1 does not disclose the curing of a coating precursor material using at least one single electromagnetic pulse only, but uses thermal curing, for example a vapor curing oven.

U.S. Pat. No. 5,316,791 A discloses a process for improving the impact resistance of a plastic substrate by applying directly to at least one surface thereof a primer layer of aqueous polyurethane dispersion which can be sufficiently cured by air drying at ambient temperature. An organic or siloxane abrasion resistant coating composition can be applied directly over the polyurethane primer layer in less than one hour. This top coating may be cured or polymerized thermally or by irradiation. For curing the top coating by irradiation, polymerization may be initiated by any source of ionizing radiation capable of producing free radicals, including infrared, gamma radiation, microwave, and by electron beam or ultraviolet radiation. In example 1 of U.S. Pat. No. 5,316,791 A, a primer coating (Witcobond W-240, an aqueous polyurethane dispersion), a hard coating (SILVUE 339, a colloidal silica filled siloxane coating based on methyltrimethoxysilane and gamma glycidoxypropyl-trimethoxysilane), and an anti-reflective coating were applied on different plastic substrates. The impact resistance of the coated plastic substrates was improved compared to the impact resistance of plastic substrates without the primer coating. U.S. Pat. No. 5,316,791 A does not disclose the curing of a coating precursor material using at least one single electromagnetic pulse but by using a continuous irradiation; further U.S. Pat. No. 5,316,791 A does not disclose the adjustability of mechanical properties like the impact resistance of a coated lens without amending the coating sequence.

U.S. Pat. No. 6,187,444 B1 discloses photochromic polyurethane coatings and photochromic articles, particularly photochromic plastic materials for optical applications, such as photochromic ophthalmic plastic lenses. The photochromic polyurethane coating composition may be cured at temperatures ranging from 22° C. to 200° C. or by irradiating the photochromic polyurethane coating composition with infrared, ultraviolet, gamma or electron radiation so as to initiate the polymerization reaction of the polymerizable components in the coating. U.S. Pat. No. 6,187,444 B1 does not specify the curing by irradiation as irradiation with at least one single electromagnetic pulse but a continuous irradiation.

US 2004/0156983 A1 discloses a spin coating process for coating a spectacle lens with a primer layer, a hard coating layer, a two-layer sol-gel AR coating, and a hydrophobic layer. After the hard coating layer has been spin coated, the coated lens is exposed to a source of IR light for solvent flash off and precure to tack-free. Afterwards, the hard coating layer is fully cured in a vapor curing oven at about 100° C. to about 150° C. for about five minutes to about twenty minutes.

SUMMARY

Therefore, it is an object of the present disclosure to provide a method for treating at least one coating precursor material on at least one surface of an optical lens substrate in that the properties of the corresponding coating or the resulting coated lens are modifiable and/or adjustable. In addition, the modification and/or the adjustment of the properties should be realized in a very short time while simultaneously converting the at least one coating precursor material into at least one coating.

An object underlying the present disclosure was solved by providing a method wherein at least one mechanical property and/or at least one optical property and/or at least one functional property each of the coated lens is adjusted based on a recipe used for the conversion of the at least one coating precursor material into at least one coating. Exemplary embodiments of the method are discussed below, which might be realized in an isolated fashion or in any arbitrary combination.

As an "optical lens substrate" an uncoated or precoated blank, the blank being defined in section 3.8.1 of DIN EN ISO 13666:2019-12 as piece of optical material with one optically finished surface for the making of a lens; an uncoated or precoated single-vision blank, the single-vision blank being defined in section 3.8.2 of DIN EN ISO 13666:2019-12 as blank with the finished surface having a single nominal surface power; an uncoated or precoated multifocal blank, the multifocal blank being defined in section 3.8.3 of DIN EN ISO 13666:2019-12 as blank with the finished surface having two or more visibly divided portions of different dioptric powers or focal powers; an uncoated or precoated progressive-power blank, the progressive-power blank being defined in section 3.8.5 of DIN EN ISO 13666:2019-12 as power-variation blank where the finished surface is a progressive-power surface; an uncoated or precoated degressive-power blank, the degressive-power blank being defined in section 3.8.6 of DIN EN ISO 13666:2019-12 as power-variation blank where the finished surfaces is a degressive-power surface; an uncoated or precoated finished lens, the finished lens being defined in section 3.8.7 of DIN EN ISO 13666:2019-12 as lens of which both sides have their final optical surface; an uncoated or precoated uncut lens, the uncut lens being defined in section 3.8.8 of DIN EN ISO 13666:2019-12 as finished lens prior to edging or an uncoated or precoated edged lens, the edged lens being defined in section 3.8.9 of DIN EN ISO 13666:2019-12 as finished lens edged to final size and shape, may be used. If a blank is precoated, the respective finished surface comprises at least one coating. If a lens is precoated, at least one side comprises at least one coating. typically, the optical lens substrate is an uncoated or precoated finished lens or an uncoated or precoated uncut lens. The optical lens substrate can be classified as afocal lens with nominally zero dioptric power according to section 3.6.3 of DIN EN ISO 13666:2019-12 or as corrective lens, i.e., as a lens with dioptric power according to section 3.5.3 of DIN EN ISO 13666:2019-12. According to DIN EN ISO 13666:2019-12, the optical lens substrate can further be classified as single-vision lens according to section 3.7.1; as position-specific single-vision lens according to section 3.7.2; as multifocal lens according to section 3.7.3; as bifocal lens according to section 3.7.4; as trifocal lens according to section 3.7.5; as fused multifocal lens according to section 3.7.6; as power-variation lens according to section 3.7.7; as progressive-power lens according to section 3.7.8; or as degressive-power lens according to section 3.7.9. Further, the optical lens substrate can be a protective lens according to section 3.5.4 of DIN EN ISO 13666:2019-12; an absorptive lens according to section 3.5.5 of DIN EN ISO 13666:2019-12; a tinted lens according to section 3.5.6 of DIN EN ISO 13666:2019-12; a clear lens according to section 3.5.7 of DIN EN ISO 13666:2019-12; a uniformly tinted lens according to section 3.5.8 of DIN EN ISO 13666:2019-12; a gradient-tinted lens according to section 3.5.9 of DIN EN ISO 13666:2019-12; a double gradient-tinted lens according to section 3.5.10; a photochromic lens according to section 3.5.11 of DIN EN ISO 13666:2019-12 or a polarizing lens according to section 3.5.12 of DIN EN ISO 13666:2019-12.

The optical lens substrate is typically, based on an optical material, the optical material being defined according to section 3.3.1 of DIN EN ISO 13666:2019-12 as transparent material capable of being manufactured into optical components. The optical lens substrate can be made of mineral glass and/or of an organic hard resin such as a thermosetting hard resin according to section 3.3.3 of DIN EN ISO 13666:2019-12; a thermoplastic hard resin according to section 3.3.4 of DIN EN ISO 13666:2019-12; or a photochromic material according to section 3.3.5 of DIN EN ISO 13666:2019-12. typically, the optical lens substrate is based on at least one of the optical materials mentioned in Table 1 below, typically, on at least one of the organic hard resins.

TABLE 1

Examples of optical materials for blanks or lenses

| Trade name | Base material | Average refractive index nD* | Abbe number VD* |
|---|---|---|---|
| CR-39, CR-330, CR-607, CR-630, RAV 700, RAV 7NG, RAV 7AT, RAV 710, RAV 713, RAV 720 | Polyallyldiglycol carbonate ((P)ADC) | 1.500 | 56 |
| RAVolution | Polyurea/Polyurethane | 1.500 | 54 |
| Trivex | Polyurea/Polyurethane | 1.530 | 45 |
| Panlite, Lexan, Makrolon | Polycarbonate (PC) | 1.590 | 29 |

TABLE 1-continued

Examples of optical materials for blanks or lenses

| Trade name | Base material | Average refractive index nD* | Abbe number VD* |
|---|---|---|---|
| MR-6 | Polythiourethane | 1.598 | |
| MR8 | Polythiourethane | 1.598 | 41 |
| MR-7 | Polythiourethane | 1.664 | 32 |
| MR-10 | Polythiourethane | 1.666 | 32 |
| MR-174 | Polyepisulfide | 1.738 | 32 |
| MGC 1.76 | Polyepisulfide | 1.76 | 30 |
| | Mineral 1.5 | 1.525 | 58 |
| | Mineral 1.6 | 1.604 | 44 |
| | Mineral 1.7 | 1.701 | 39.2 |
| | Mineral 1.8 | 1.802 | 34.4 |
| | Mineral 1.9 | 1.885 | 30 |

*Based on sodium D line

In case the optical lens substrate is made of mineral glass and of an organic hard resin such as a thermosetting hard resin or a thermoplastic hard resin, the mineral glass typically, comprises at least one ultrathin lens. In this case, the organic hard resin may comprise an uncoated or precoated blank, an uncoated or precoated single-vision blank, an uncoated or precoated multifocal blank, an uncoated or precoated power-variation blank, an uncoated or precoated progressive-power blank, an uncoated or precoated degressive-power blank, an uncoated or precoated finished lens, an uncoated or precoated uncut lens, or an uncoated or precoated edged lens, each blank comprising on at least on the finished surface thereof at least one ultrathin lens and each lens comprising on at least one side thereof at least one ultrathin lens. After surfacing the opposite surface of a blank, this opposite surface may comprise at least one ultrathin lens as well, the at least one ultrathin lens being identical or different to the other one in relation to the glass composition, to the average thickness and/or to the shape. Further, the optical lens substrate may be made of at least two ultrathin lenses comprising a plastic film or foil in-between. The at least one ultrathin lens may be based on various glass compositions, for example, be borosilicate glass, aluminium borosilicate glass or alkali-free borosilicate glass. typically, the at least one ultrathin lens is based on a borosilicate glass or an aluminium borosilicate glass. The at least one ultrathin lens typically, has an average thickness from a range from 10 μm to 1000 μm, further typically, from a range from 13 μm to 760 μm, further typically, from a range from 16 μm to 510 μm, more typically, from a range from 18 μm to 390 μm and most typically, from a range from 19 μm to 230 μm. Especially typically, the at least one ultrathin lens has an average thickness from a range from 21 μm to 121 μm or from a range from 80 μm to 220 μm. The average thickness of the at least one ultrathin lens is understood to mean the arithmetic average. Below an average thickness of 10 μm, the at least one ultrathin lens is too mechanically unstable to be able to be combined with at least one of the surfaces of the organic hard resin component mentioned before. Above an average thickness of 1000 μm, the at least one ultrathin lens can lead to spectacle lenses that would have too great an edge thickness or too great a middle thickness of the spectacle lens. The average thickness of the at least one ultrathin lens is measured typically, with the Filmetrics F10-HC instrument from Filmetrics Inc. The at least one ultrathin lens typically, has a surface roughness Ra of <1 nm. Further typically, the surface roughness Ra of the at least one ultrathin lens is within a range from 0.1 nm to 0.8 nm, more typically, within a range from 0.3 nm to 0.7 nm and most typically, within a range from 0.4 nm to 0.6 nm. The aforementioned values for the surface roughness Ra are each based on the front surface and the back surface of the at least one ultrathin lens of an unformed, planar ultrathin lens. After forming, the aforementioned values are in each case applicable typically, to that surface of the ultrathin lens that has not been brought into contact with the shaped body. Depending on the shaped body used for forming, the aforementioned values may also be applicable to the surface of the at least one ultrathin lens that was in contact with the shaped body used for forming. The surface roughness Ra of the at least one ultrathin lens is typically, determined by means of white light interferometry, typically, with the NewView 7100 instrument from Zygo Corporation. Ultrathin lenses are commercially available, for example, under the names: D 263 T eco, D 263 LA eco, D 263 M, AF 32 eco, SCHOTT AS 87 eco, B 270 I, each from Schott AG, or Corning Willow Glass or Corning Gorilla Glass, each from Corning Inc.

The application of at least one coating precursor material to at least one surface of the uncoated or precoated optical lens substrate can be carried out by different processes. For example, the application of the at least one coating precursor material to at least one surface of the uncoated or precoated optical lens substrate can be carried out by spin-coating, spray coating, dip-coating, atomic layer deposition, ion beam deposition, chemical vapour deposition, thermal evaporation, electron beam evaporation, magnetron sputtering, ion assisted sputtering, ion beam sputtering, printing or physical vapour deposition, optionally followed by a drying step and a sintering step and/or a hardening step and/or a curing step.

These application methods allow to apply at least one coating precursor material to at least one surface of the uncoated or precoated optical lens substrate with a defined thickness and continuity. typically, the at least one coating precursor material is applied to at least one surface of the uncoated or precoated optical lens substrate by dip-coating or by spin-coating, followed by a drying step and a sintering step and/or a hardening step and/or a curing step. In case at least two coating precursor materials are applied subsequently to at least one surface of the uncoated or precoated optical lens substrate, typically, by one of the methods mentioned before, the first coating precursor material applied to at least one surface of the uncoated of precoated optical lens substrate may be dried only. In this case, after the subsequent application of the second coating precursor material to the dried surface of the first coating precursor material, the second coating precursor material typically, is dried and then the first and second coating precursor materials are sintered and/or hardened and/or cured to convert both coating precursor materials in the respective coating. Analogously, if a third coating precursor material is subsequently applied to the second coating precursor material, i.e., the third coating precursor material then being the outermost coating precursor material, the applied first and second coating precursor materials may be dried only before the application of the third coating precursor material. After typically, having dried the third coating precursor material, the first, second and third coating precursor materials are sintered and/or hardened and/or cured to convert all three coating precursor materials in the respective coating. typically, the before described process may apply to any further and subsequently applied coating precursor material.

After having applied the at least one coating precursor material to at least one surface of the uncoated or precoated optical lens substrate, a drying step and a hardening step and/or a sintering step and/or a curing step is performed to convert the at least one coating precursor material into the at least one coating. This processing or conversion is done by irradiation with at least one single electromagnetic pulse. The at least one single electromagnetic pulse can be applied from at least one electromagnetic source selected from the group consisting of at least one flash lamp, typically, from at least one xenon flash lamp, at least one halogen lamp, at least one directed plasma arc, at least one laser, at least one microwave generator, at least one induction heater, at least one electron beam, at least one stroboscope and at least one mercury lamp. The at least one single electromagnetic pulse is typically, applied from at least one flash lamp. typically, the at least one flash lamp is a flash lamp filled with a gas selected from xenon, krypton and/or argon, typically, xenon.

The at least one single electromagnetic pulse has typically, a wavelength in the range from 100 nm to 1800 nm, further typically, in the range from 150 nm to 1300 nm, more typically, in the range of 170 nm to 1100 nm and most typically, in the range from 200 nm to 1000 nm. The at least one single electromagnetic pulse also typically, has a wavelength in the range from 350 nm to 1000 nm, more typically, in the range from 400 nm to 800 nm, most typically, in the range from 420 nm to 700 nm. The wavelength of the at least one single electromagnetic pulse applied from at least one of the before mentioned electromagnetic sources is typically, in these wavelength ranges.

"Single electromagnetic pulse" means the light that is delivered by at least one of the above-mentioned electromagnetic sources and applied to at least one surface of an uncoated or precoated optical lens substrate comprising at least one coating precursor material. The at least one single electromagnetic pulse may be applied in one of the wavelength ranges defined above. The at least one single electromagnetic pulse typically, has a defined duration, i.e., a defined envelope. The envelope of the at least one single electromagnetic pulse is defined as the period of time in which the at least one single electromagnetic pulse is applied to at least one surface of the uncoated or precoated optical lens substrate comprising the at least one coating precursor material. The envelope may be in a range from 50 µs to 200 ms, typically, in a range from 100 µs to 150 ms. Each single electromagnetic pulse may comprise at least two micro-pulses, each of the at least two micro-pulses having a defined duration within the envelope of each single electromagnetic pulse. The duration of the at least two micro-pulses within the envelope of a single electromagnetic pulse may be identical to or different from each other. The percentage of the duration of all the micro-pulses within the envelope of a single electromagnetic pulse is defined as the duty cycle of the single electromagnetic pulse. Further, the at least one single electromagnetic pulse or at least one micro-pulse has a defined peak intensity. The peak intensity is defined as the rate at which light energy is applied per unit time to a unit area of the at least one coating precursor material by i) one single electromagnetic pulse or ii) one micro-pulse within a single electromagnetic pulse. The peak intensity is typically, in the range from 0.01 W/cm$^2$ to 200 W/cm$^2$, further typically, in the range from 0.1 W/cm$^2$ to 150 W/cm$^2$, more typically, from 0.5 W/cm$^2$ to 100 W/cm$^2$ and most typically, from 1 W/cm$^2$ to 60 W/cm$^2$. The peak intensity of at least two micro-pulses within the envelope of a single electromagnetic pulse may be identical to or different from each other. typically, the peak intensity of the at least two micro-pulses within the envelope of a single electromagnetic pulse is identical to each other. The peak intensity between two consecutive micro-pulses within the envelope of a single electromagnetic pulse does not need to be zero or does not need to be constant or does not need to be equal. If necessary, each single electromagnetic pulse may be repeated to provide an electromagnetic pulse train for drying and hardening and/or sintering and/or curing at least one coating precursor material being applied to at least one surface of the uncoated or precoated optical lens substrate. Within the electromagnetic pulse train, each single electromagnetic pulse may be repeated at least twice and up to 1000 times, typically, each single electromagnetic pulse is repeated between 2 and 500 times, more between 2 and 100 times typically, and most typically, between 2 and 75 times. Within an electromagnetic pulse train, typically, an identical single electromagnetic pulse is repeated. Within an electromagnetic pulse train, the envelope of each single electromagnetic pulse may be identical to or different from each other. typically, within an electromagnetic pulse train, the envelope of each single electromagnetic pulse is identical. Within an electromagnetic pulse train, each single electromagnetic pulse may comprise at least two micro-pulses, the at least two micro-pulses may be identical to or different from each other with respect to their peak intensity, duration and/or duty cycle. typically, within an electromagnetic pulse train, each single electromagnetic pulse may comprise at least two micro-pulses, the at least two micro-pulses being identical to each other with respect to their peak intensity, duration and/or duty cycle. Within the electromagnetic pulse train comprising at least two single electromagnetic pulses, the at least two single electromagnetic pulses may be repeated with a repetition rate in a range from 0.1 Hz to 5 Hz, typically, from 0.2 Hz to 4 Hz, further typically, from 0.3 Hz to 3.5 Hz and most typically, from 0.4 to 2 Hz. The peak intensity of at least one single electromagnetic pulse within the envelope of the at least one single electromagnetic pulse may progressively decrease within the envelope and/or with each micro-pulse within the at least one single electromagnetic pulse. For example, this decrease can be due to limitations of the charged capacitors of the electromagnetic source used for generating the at least one single electromagnetic pulse. The dose applied by at least one single electromagnetic pulse to the uncoated or precoated optical lens substrate comprising at least one coating precursor material is the average intensity delivered with each single electromagnetic pulse over the total duration of the envelope where each single electromagnetic pulse may or may not comprise at least two micro-pulses each delivering a discrete amount of intensity. The dose applied by at least one single electromagnetic pulse may typically, be within the range from 0.001 J/cm$^2$ to 50 J/cm$^2$, further typically, from 0.1 J/cm$^2$ to 30 J/cm$^2$, more typically, from 1 J/cm$^2$ to 20 J/cm$^2$ and most typically, from 2.0 J/cm$^2$ to 15 J/cm$^2$. Particularly typically, the dose applied is within a range from 3 J/cm$^2$ to 8 J/cm$^2$.

The drying and hardening and/or sintering and/or curing process using at least one single electromagnetic pulse may be applied in a batch process or in a continuous process. A batch process may be done for example by drying and hardening and/or sintering and/or curing at least one coating precursor material on at least one surface of an uncoated or precoated optical lens substrate with no displacement during the drying and hardening and/or sintering and/or curing process. A continuous process may be done for example by drying and hardening and/or sintering and/or curing at least one coating precursor material on at least one surface of the optical lens substrate with displacement during the drying and hardening and/or sintering and/or curing process. An example of the continuous process is by using a conveyor belt. Both in a batch process and in a continuous process a single uncoated or precoated optical lens substrate or at least two uncoated or precoated optical lens substrates, each being coated with at least one coating precursor material on at least one surface thereof, may be used for drying and hardening and/or sintering and/or curing the respective coating precursor material with at least one single electromagnetic pulse.

The total process duration, i.e., the total time needed for drying and hardening and/or sintering and/or curing at least one coating precursor material applied on at least one surface of an uncoated or precoated optical lens substrate by using at least one single electromagnetic pulse as described above, lies within a range typically, from 100 µs to 10 min, further typically, from 300 µs to 7 min, more typically, from 500 µs to 5 min and most typically, from 1 ms to 3 min. Within these extremely short total process duration ranges, the total process duration for converting at least one coating precursor material into at least one coating is highly flexible. Simultaneously, within these extremely short total process duration ranges, at least one mechanical property, typically, selected from the group consisting of indentation hardness, scratch resistance, adhesion, delamination, crazing and water uptake of the optical lens substrate; and/or at least one optical property, typically, selected from the group consisting of transmittance, absorbance and reflectance, typically, from wavelengths ranging from 300 nm to 780 nm, clarity and yellowing; and/or at least one functional property, typically, selected from the group consisting of control of the surface wetting, the photochromic performance, the surface cleanability, tint absorption or uptake, the surface tension and the chemical composition, each of the coated lens is adjustable or modifiable or tuneable to meet a given requirement for at least one of the before mentioned properties or to obtain a specific target value for at least one of those properties. Adjustment or modification or tunability of at least one mechanical property and/or at least one optical property and/or at least one functional property in the meaning of this application should not be confused with the optimization of the respective mechanical property and/or optical property and/or functional property. The target value of a mechanical property is the value that is aimed to be achieved for the respective mechanical property. Different target values for the identical mechanical property may exist. The target value of an optical property is the value that is aimed to be achieved for the respective optical property. Different target values for the identical optical property may exist. The target value of a functional property is the value that is aimed to be achieved for the respective functional property. Different target values for the identical functional property may exist. When different target values for an identical property exists, the target value of the respective property is adjustable or modifiable or tuneable or the respective property is adjustable or modifiable or tuneable. Different target values may be aimed to meet different requirements. typically, the at least one target value is a predefined target value.

Typically, the total process duration for drying and hardening and/or sintering and/or curing at least one coating precursor material on at least one surface of the uncoated or precoated optical lens substrate using at least one single electromagnetic pulse is reduced in a range from 60% to 99.99%, further typically, in a range from 70% to 99.5%, more typically, in a range from 80% to 99% and most typically, in a range from 90% to 98.5%, each as compared to a conventional thermal curing process using direct heating to achieve the identical target values of at least one mechanical and/or at least one optical and/or at least one functional property each of the coated lens. Further typically, the total process duration for drying and hardening and/or sintering and/or curing at least one coating precursor material on at least one surface of the uncoated or precoated optical lens substrate using at least one single electromagnetic pulse is reduced in a range from 60% to 99.99%, further typically, in a range from 70% to 99.5%, more typically, in a range from 80% to 99% and most typically, in a range from 90% to 98.5%, each as compared to a conventional thermal curing process using direct heating to achieve the identical target values of all mechanical and/or all optical and/or all functional properties each of the coated lens. "All" properties include each of the respective properties listed before with respect to the mechanical properties and with respect to the optical properties and with respect to the functional properties. Further typically, the total process duration for drying and hardening and/or sintering and/or curing at least one coating precursor material on at least one surface of the uncoated or precoated optical lens substrate using at least one single electromagnetic pulse is reduced in a range from 60% to 99.99%, further typically, in a range from 70% to 99.5%, more typically, in a range from 80% to 99% and most typically, in a range from 90% to 98.5%, each as compared to a conventional thermal curing process using direct heating to achieve the identical target values of all mechanical and/or all optical properties each of the coated lens. All mechanical properties include each mechanical property listed before with respect to the mechanical properties. All optical properties include each optical property listed before with respect to the optical properties.

Typically, the total process duration for drying and hardening and/or sintering and/or curing at least one coating precursor material on at least one surface of the uncoated or precoated optical lens substrate using at least one single electromagnetic pulse is reduced in a range from 80% to 99.99%, further typically, in a range from 85% to 99.8%, more typically, in a range from 90% to 99.5% and most typically, in a range from 95% to 99%, each as compared to a conventional thermal curing process using direct heating to achieve the identical target values of at least one mechanical property of the coated lens, the at least one mechanical property typically, being selected from the group consisting of indentation hardness, scratch resistance, adhesion, delamination, crazing and water uptake of the optical substrate.

Typically, the total process duration for drying and hardening and/or sintering and/or curing at least one coating precursor material on at least one surface of the uncoated or precoated optical lens substrate, typically, the uncoated optical lens substrate, using at least one single electromagnetic pulse is reduced in a range from 60% to 99.99%, further typically, in a range from 70% to 99.5%, more typically, in a range from 80% to 99% and most typically, in a range from 90% to 98.5%, each as compared to a conventional thermal curing process using direct heating to achieve the identical target values of at least one optical property of the coated lens, the at least one optical property typically, being selected from the group consisting of transmittance, absorbance and reflectance, typically, from wavelengths ranging from 300 nm to 780 nm, clarity and yellowing.

Typically, the total process duration for drying and hardening and/or sintering and/or curing at least one coating precursor material on at least one surface of the uncoated or precoated optical lens substrate using at least one single electromagnetic pulse is reduced in a range from 5% to 99.99%, further typically, in a range from 25% to 99.5%, more typically, in a range from 50% to 99% and most typically, in a range from 75% to 98.5%, each as compared to a conventional thermal curing process using direct heating to achieve the identical target values of at least one functional property of the coated lens, typically, selected from the group consisting of control of the surface wetting, the photochromic performance, the surface cleanability, tint absorption or uptake, the surface tension and the chemical composition.

Further typically, the total process duration for drying and hardening and/or sintering and/or curing at least one coating precursor material on at least one surface of the uncoated or precoated optical lens substrate, typically, the uncoated optical lens substrate, using at least one single electromagnetic pulse is reduced in a range from 60% to 99.99%, further typically, in a range from 70% to 99.5%, more typically, in a range from 80% to 99% and most typically, in a range from 90% to 98.5%, each as compared to a conventional thermal curing process using direct heating to achieve the identical target values of at least one optical property of the coated lens, and to achieve the identical target values of at least one mechanical property of the coated lens, the at least one mechanical property typically, being selected from the group consisting of indentation hardness, scratch resistance, adhesion, delamination, crazing and water uptake of the optical lens substrate and/or to achieve the identical target values of at least one functional property of the coated lens, the at least one functional property being selected from the group consisting of control of the surface wetting, the photochromic performance, the surface cleanability, tint absorption or uptake, the surface tension and the chemical composition.

For each comparison mentioned in this application between the drying and hardening and/or sintering and/or curing using at least one single electromagnetic pulse and a conventional thermal curing process using direct heating, the conventional thermal curing process is assumed to be a direct heating process for thermally drying and thermally hardening and/or thermally sintering and/or thermally curing at least one coating precursor material for three hours at ambient atmosphere and at a temperature below the threshold temperature of the optical lens substrate, typically, at a temperature which is 5% to 20%, further typically, 15%, more typically, 12% and most typically, 10% lower than the threshold temperature of the optical lens substrate.

The total process duration for drying and hardening and/or sintering and/or curing for example at least one hard coating precursor material applied on at least one surface of an uncoated or precoated optical lens substrate by at least one electromagnetic pulse as described above, may be in a range typically, from 50 µs to 20 min, further typically, from 100 µs to 10 min, more typically, from 500 µs to 5 min, and most typically, from 1 ms to 3 min. Particularly preferred is a total process duration ranging from 5 ms to 2 min or from 10 ms to 30 s. Due to the extremely short total process duration, the final temperature of the uncoated or precoated optical lens substrate and/or of the coated lens is not significantly increased. typically, the optical properties and/or the mechanical properties and/or the functional properties of neither the uncoated or precoated optical lens substrate nor of the coated lens are deteriorated due to thermal effects. In comparison, the total thermal process duration, i.e., the total time needed with direct heating for thermally drying and thermally hardening and/or thermally sintering and/or thermally curing at least one hard coating precursor material applied on at least one surface of an uncoated or precoated optical lens substrate typically, takes at least 30 minutes to five hours, typically, three hours, at a temperature below the threshold temperature of the uncoated or precoated optical lens substrate and at ambient atmosphere. This longer total thermal process duration is explainable by the limitation in temperature connected with the threshold temperature of the uncoated or precoated optical lens substrate and/or the hard coating precursor material.

To be able to convert the at least one coating precursor material into at least one coating within a minimum total process duration, typically, below 10 minutes, further typically, in a range of 4 seconds to below 5 minutes, further typically, in a range of 3 seconds to below 3 minutes, further typically, in a range of 2 seconds to below 2 minutes, particularly typically, in a range of 1 second to below 1 minutes and most particularly typically, in a range of 0.5 seconds to below 30 seconds, the at least one electromagnetic pulse typically, is characterized by the highest possible peak intensity, the highest possible repetition rate, the lowest number of repetitions of the at least one single electromagnetic pulse. The at least one single electromagnetic pulse may be exactly one single electromagnetic pulse, or each single electromagnetic pulse may be subdivided into at least two micro-pulses. If the at least one single electromagnetic pulse is divided into at least two micro-pulses, no energy is transferred to the at least one coating precursor material in-between the at least two micro-pulse within the same at least one singe electromagnetic pulse. In-between the at least two micro-pulse within the same at least one singe electromagnetic pulse, a temporarily reduction of the temperature occurs to avoid cosmetic defects of the at least one coating, such as cracking and/or burning and/or delamination and/or warping, and/or pinholes, and/or alligatoring, and/or blistering, and/or bubbling, and/or crating and/or crazing and/or flaking and/or wrinkling; and to allow thermal relaxation of the at least one coating precursor material and the optical lens substrate. The minimum total process duration depends at least on the type of the at least one coating precursor material and on the type of optical lens substrate. typically, within the minimum total process duration the at least one coating meets an identical requirement or an identical target value of at least one mechanical property and/or at least one optical property and/or at least one functional property when compared to the identical type of coating precursor material or the identical coating precursor material, each typically, applied to the identical optical lens substrate, each converted into the identical at least one coating using a thermal process with direct application of heat. With respect to the thermal process the definition given before with respect the conventional thermal curing process applies.

The drying and hardening and/or sintering and/or curing using at least one single electromagnetic pulse not only converts at least one coating precursor material into at least one coating on at least one surface of an optical lens substrate, but also allows to either optimize or to adjust or to modify or to tune at least one mechanical property and/or at least one optical property and/or at least one functional property each of the coated lens. This optimization or adjustment or modification or tunability is typically, based on a recipe or the respective recipe used for the conversion of the at least one coating precursor material into at least one coating. A recipe is defined as the selection of a plurality of process parameters which are simultaneously or sequentially used to meet a requirement or to obtain a target value of exact one mechanical property and/or exact one optical property and/or exact one functional property. The process parameters in connection with the application of at least one electromagnetic pulse may be selected of at least one from the group consisting of the wavelength of light used, the number of single electromagnetic pulses in the electromagnetic pulse train, the peak intensity of the at least one single electromagnetic pulse, the total process duration, the total dose delivered by at least one single electromagnetic pulse, the number of micro-pulses within a one single electromagnetic pulse, the average duty cycle, the duration of the envelope, and the total number of repetitions of the at least one single electromagnetic pulse. Changing the process parameters within a recipe; or changing the combination of process parameters within a recipe; or changing at least one process parameter within a recipe each may result in a variation of the mechanical and/or optical and/or functional parameter target value, i.e., the target value of the respective mechanical property, typically, the respective exact one mechanical property; and/or the target value of the respective optical property, typically, the respective exact one optical property; and/or the target value of the respective functional property, typically, the respective exact one functional property. The respective mechanical property, the respective optical property and the respective functional property each may be selected from one of the above-mentioned ones—which by the way typically, also applies throughout the whole application when reference is made to a mechanical, optical and/or functional property.

In comparison, the process parameters in connection with the direct application of heat, for example, in a thermal curing process using ovens or furnaces, are restricted to the total process duration, the temperature, which is typically, below the threshold temperature of the uncoated or pre-coated optical lens substrate and/or the at least one coating precursor material, and the atmosphere. Phrased differently, as the number of process parameters that may be changed in a recipe for the application of at least one single electromagnetic pulse is much higher than the number of process parameters that may be changed in a recipe for the direct application of heat in a thermal curing process, the adjustability or the tunability of the identical mechanical property and/or the identical optical property and/or the identical functional property of a coated lens is variable in a much wider range when at least one single electromagnetic pulse is applied to at least one surface of an optical lens substrate comprising at least one coating precursor material as compared to when a thermal curing process for the conversion of the identical coating precursor material into the respective identical coating comprised on the identical optical lens substrate would have been used. By using at least one single electromagnetic pulse for the conversion of at least one coating precursor material into the respective at least one coating, the adjustability or the tunability to obtain different target values for the identical mechanical property and/or for the identical optical property and/or for the identical functional property each of the coated lens surprisingly and advantageously does not exclude that at least one target value of another mechanical property and/or of another optical property and/or of another functional property, again each of the coated lens, is adjusted or tuned as well or is optimized. If, for example, the target values of the identical mechanical property, for example the indentation hardness, of the coated lens are adjusted or tuned, typically, by a variation of the process parameters of the recipe and/or by variation of at least one process parameter of the recipe used for the application of at least one single electromagnetic pulse, this adjustment or tunability may have an influence on at least one target value of another, different mechanical property, such as for example the scratch resistance, of the coated lens. However, this adjustment or tunability of the target value(s) or exact one target value of the mechanical property, in this example the indentation hardness, does not exclude the adjustment or the tunability or even the optimization of at least one target value of the other, different mechanical property, in this example, the scratch resistance. Analogously, if, for example the target values of the identical mechanical property, for example the indentation hardness, of the coated lens are adjusted or tuned, typically, by a variation of the process parameters of the recipe and/or by variation of at least one process parameter of the recipe used for the application of at least one single electromagnetic pulse, this adjustment or tunability may have an influence on at least one target value of another property, such as for example at least one optical property of the coated lens, the at least one optical property being for example the yellowing of the coated lens. Again, the adjustment or the tunability of at least one target value of the indentation hardness may have an influence on the at least one target value of the at least one optical property, as for example the yellowing, of the coated lens. However, this adjustment or this tunability of the at least one target value of the indentation hardness does not exclude the adjustment or the tunability or even the optimization of at least one target value of the at least one optical property, here the yellowing. typically, and to ensure comparability, the conversion of the identical coating precursor material into the identical coating on the identical uncoated or identically precoated optical lens substrate is compared.

Optimization of exact one mechanical property or exact one optical property or exact one functional property in the meaning of this application is to find the recipe that allows having the target value for the exact one mechanical property or the exact one optical property or the exact one functional property. typically, this target value is the optimum or best value that is to be achieved for the respective property. Process parameters of the recipe that typically, are considered for the optimization of the exact one mechanical property or the exact one optical property or the exact one functional property are at least the total process duration, wavelength of each single electromagnetic pulse, the total dose delivered by at least one single electromagnetic pulse, the number of micro-pulses within a one single electromagnetic pulse, the average duty cycle, and/or the total number of repetitions of the at least one single electromagnetic pulse. Choosing the preferred value of each process parameter within a recipe is based on minimizing its value while achieving the optimized exact one mechanical property or the optimized exact one optical property or the optimized exact one functional property, more specifically the optimized exact one value for the respective mechanical property or the optimized exact one value for the respective optical property or the optimized exact one value for the respective functional property. Other mechanical and/or optical and/or functional properties which are different to the exact one mechanical property or to the exact one optical property or to the exact one functional property can have arbitrary values or arbitrary target values.

Adjustment or modification or tunability of at least one mechanical property and/or at least one optical property and/or at least one functional property in the meaning of this application is the possibility to select between different requirements or different target values for at least one mechanical property and/or at least one optical property and/or at least one functional property. This selection can be done by changing at least one process parameter within a recipe; or changing the combination of process parameters within a recipe; or changing at least one process parameter within a recipe, typically, the process parameter(s) as defined before. Other mechanical and/or optical and/or functional properties which are different to the at least one adjusted or modified or tuned mechanical property and/or to the at least one adjusted or modified or tuned optical property and/or to the at least one adjusted or modified or tuned functional property can have arbitrary values or arbitrary target values.

The adjustment or the modification or the tunability of at least one mechanical property and/or of at least one optical property or of at least one functional property is typically, given by using at least two recipes that allow to change at least one specific target value within a given range of the selected mechanical and/or optical and/or functional property or properties. This given range could be limited due to the inherent limit values of at least one mechanical property and/or at least one optical property and/or at least one functional property or properties. Alternatively, this given range can be artificially imposed, for example to meet required specifications.

Each specific target value of either at least one mechanical property or at least one optical property or at least one functional property can be attained by varying at least one process parameter within a recipe for the selected mechanical or optical or functional property, typically, the process parameter(s) as defined before. Different recipes can provide the same specific target value for the selected mechanical or optical or functional property. Alternatively, different recipes can provide different target values within a given range for the selected mechanical or optical or functional property. The adjustment or modification or tunability of either at least one mechanical property and/or at least one optical property and/or at least one functional property within a given range is the possibility to select between at least two different target values for the selected mechanical or optical or functional property.

As an example for adjusting or modifying or tuning a mechanical property, the adjustment or the modification or the tunability of the indentation hardness of at least one coating precursor material on at least one surface of the uncoated or precoated optical lens substrate requires at least two recipes. The at least two recipes may comprise at least one of the following process parameters: the total process duration, the wavelength of each single electromagnetic pulse, the total dose delivered by at least one single electromagnetic pulse, the number of micro-pulses within a one single electromagnetic pulse, the average duty cycle, the total number of repetitions of the at least one single electromagnetic pulse or the repetition rate of the at least one single electromagnetic pulse. Variation of at least one of the process parameters provides a different recipe, which allows to select a different value of the indentation hardness of the coated lens.

Modifying the recipe by, for example, selecting the total dose delivered by at least one single electromagnetic pulse, selecting the total number of repetitions of the at least one single electromagnetic pulse and/or selecting the repetition rate of the at least one single electromagnetic pulse allows to adjust or to modify or to tune the indentation hardness value of the coated lens. The indentation hardness value of the coated lens could be adjusted or modified or tuned for example from 100 MPa to 2 GPa. The indentation hardness is typically, determined with the Ultra Nanoindentation Tester $UNHT^3$, company Anton Paar GmbH.

As an example for adjusting or modifying or tuning an optical property, the adjustment or modification or tunability of the transmittance in the wavelength range from 300 nm to 780 nm of at least one coating precursor material on at least one surface of the uncoated or precoated optical lens substrate requires at least two recipes. The at least two recipes comprise at least one of the following process parameters: total dose delivered by at least one single electromagnetic pulse, total number of repetitions of the at least one single electromagnetic pulse or the repetition rate of the at least one single electromagnetic pulse. Variation of at least one of the process parameters provides a different recipe, which allows to select a different value of the transmittance in the wavelength range from 300 nm to 780 nm of the coated lens.

Modifying the recipe by, for example, selecting the total dose delivered by at least one single electromagnetic pulse, selecting the total number of repetitions of the at least one single electromagnetic pulse and/or selecting the repetition rate of the at least one single electromagnetic pulse tunes the transmittance in the wavelength range from 300 nm to 780 nm of the at least one coating precursor material on at least one surface of the optical lens substrate. For the coated lens, the transmittance in the wavelength range from 300 nm to 780 nm value could be adjusted or modified or tuned for example in a range from 60% to 99.5%, typically, with respect to a given target value. The transmittance is typically, determined with the PerkinElmer Lambda 950S instrument.

As an example for adjusting or modifying or tuning a functional property, the adjustment or modification or tunability of time needed to darken to below 70% transmittance, typically, below 50% transmittance, more typically, below 30% transmittance and/or of time needed to fade back to clear state with transmittance above 60%, typically, above 70% transmittance, more typically, above 80% transmittance of a photochromic coated lenses after at least one coating precursor material is applied on the outermost surface of a photochromic coating on the uncoated or precoated optical lens substrate requires at least two recipes. The at least two recipes comprise at least one of the following process parameters: the total process duration, the wavelength of each single electromagnetic pulse, the total dose delivered by at least one single electromagnetic pulse, the number of micro-pulses within a one single electromagnetic pulse, the average duty cycle, the total number of repetitions of the at least one single electromagnetic pulse or the repetition rate of the at least one single electromagnetic pulse. Variation of at least one of the process parameters provides a different recipe, which allows to select a different value of the darkening and time to fade back to clear state of the coated lens.

Modifying the recipe by, for example, selecting the total dose delivered by at least one single electromagnetic pulse, selecting the total number of repetitions of the at least one single electromagnetic pulse and/or selecting the repetition rate of the at least one single electromagnetic pulse tunes the time to darken to a transmittance level of 30% in the wavelength range from 300 nm to 780 nm and/or the time to fade back to a transmittance level of 70% in the wavelength range from 300 nm to 780 nm of the at least one coating precursor material applied on at least one surface of the uncoated or precoated optical lens substrate precoated with a photochromic coating on at least one surface thereof, typically, on the front surface thereof. For the at least one coated lens, the time to darken to a transmittance level of 30% in the wavelength range from 300 nm to 780 nm and/or time to fade back to a transmittance level of 70% in the wavelength range from 300 nm to 780 nm could be adjusted or modified or tuned for example in a range from 1% to 75%, typically, with respect to a given target value.

As mentioned above, with the application of at least one electromagnetic pulse a larger number of process parameters of the recipe may simultaneously or sequentially be changed for the adjustment or the modification or the tunability of at least one mechanical property and/or at least one optical property and/or at least one functional property, more specifically the target value of at least one mechanical property and/or the target value of at least one optical property and/or the target value of at least one functional property, as compared to the application of direct heat for example via an oven or a furnace, i.e., a thermal curing process. A larger number of process parameters of the recipe to be changed provides a larger number of possibilities to realize a target value for at least one mechanical property and/or at least one optical property and/or at least one functional property each of the coated lens. A larger number of process parameters of the recipe to be changed further offers the possibility to obtain, when starting from the identical type of optical lens substrate comprising the identical type of at least one optical precursor material, a larger number of coated lenses having different mechanical and/or optical and/or functional properties. Phrased differently, by applying at least one electromagnetic pulse with different recipes to at least one identical type of coating precursor material on at least one surface of an identical type of an uncoated or precoated optical lens substrate, the conversion of the at least one coating precursor material into at least one coating may result each in a coated lens with different mechanical and/or optical and/or functional properties. typically, the total process duration for the adjustment or the modification or the tunability of the respective properties of the coated lens is within one of the above-mentioned ranges.

Using a thermal drying and sintering and/or hardening and/or curing process by direct application of heat at a temperature below or at the threshold temperature of the optical lens substrate, for example the mechanical properties of the coated lens achieved have an upper limit of the achievable target value of the respective mechanical property beyond which no further optimization or no further adjustment or no further modification or no further tunability is possible, even with a substantial increase in time. An, optionally additional, increase of the temperature above the threshold temperature of the optical lens substrate may have an influence on the mechanical properties of the coated lens but this may have a detrimental effect on the optical properties of the optical lens substrate, especially on the transmittance and yellowing index or yellowing of the coated lens. For example, a thermal drying and sintering and/or hardening and/or curing process of at least one hard coating precursor material on an optical lens substrate with a refractive index below 1.6 at 550 nm can attain indentation hardness values in the range of 450 MPa to 550 MPa with a yellowing close to 6.

In contrast thereto, using at least one electromagnetic pulse for the drying and sintering and/or hardening and/or curing of at least one coating precursor material on at least one of the surfaces of an optical lens substrate, a much bigger range with respect to the achievable target values of at least one mechanical property and/or at least one optical property and/or at least one functional property can be achieved. Despite of that achievable bigger range of target values the at least one coating precursor material typically, is dried and cured and/or sintered and/or hardened and therefore converted into at least one coating. typically, the target value range of the at least one mechanical and/or at least one optical property and/or functional property of the coated lens obtained by drying and hardening, sintering and/or curing at least one coating precursor material on at least one surface of the uncoated or precoated optical lens substrate using at least one single electromagnetic pulse is increased by a factor of up to 1500%, typically, by a factor in a range from 5% to 1200%, further typically, by a factor in a range from 10% to 800%, more typically, by a factor in a range from 15% to 700% and most typically, by a factor in a range from 20% to 600%, each as compared to the target value range obtained by thermal drying and sintering and/or hardening and/or curing process with the application of direct heat. Further typically, the target value range of the at least one mechanical property of the coated lens obtained by drying and hardening and/or sintering and/or curing at least one coating precursor material on at least one surface of the uncoated or precoated optical lens substrate using at least one single electromagnetic pulse is increased by a factor of up to 900%, typically, by a factor in a range from 5% to 900%, further typically, by a factor in a range from 10% to 800%, more typically, by a factor in a range from 15% to 700% and most typically, by a factor in a range from 20% to 600%, each as compared to the target value range obtained by thermal drying and sintering and/or hardening and/or curing process with the application of direct heat. Further typically, the target value range the at least one optical property of the coated lens obtained by drying and hardening, sintering and/or curing at least one coating precursor material on at least one surface of the uncoated or precoated optical lens substrate using at least one single electromagnetic pulse is increased by a factor of up to 800%, typically, by a factor in a range from 0.25% to 800%, further typically, by a factor in a range from 5% to 700%, more typically, by a factor in a range from 10% to 600% and most typically, by a factor in a range from 15% to 500%, each as compared to the target value range obtained by thermal drying and sintering and/or hardening and/or curing process with the application of direct heat. Further typically, the target value range the at least one functional property of the coated lens obtained by drying and hardening, sintering and/or curing at least one coating precursor material on at least one surface of the uncoated or precoated optical lens substrate using at least one single electromagnetic pulse is increased by a factor of up to 1500%, typically, by a factor in a range from 0.1% to 1250%, further typically, by a factor in a range from 0.5% to 1000%, more typically, by a factor in a range from 2.5% to 750% and most typically, by a factor in a range from 7.5% to 600%, each as compared to the target value range obtained by thermal drying and sintering and/or hardening and/or curing process with the application of direct heat. The adjustment or the modification or the tunability for example of the mechanical properties, in particular the indentation hardness, of the coated lens is typically, governed by the total dose delivered by at least one single electromagnetic pulse. Additionally or as an alternative, the adjustment or the modification or the tunability for example of the mechanical properties, in particular the indentation hardness, is typically, governed by the total process duration of the at least one single electromagnetic pulse. Additionally or as an alternative, to the previous mentioned two options, the adjustment or the modification or the tunability for example of the mechanical properties, in particular the indentation hardness, is typically, governed by the wavelength of the at least one single electromagnetic pulse. Additionally or as an alternative, to the previous mentioned three options, the adjustment or the modification or the tunability for example of the mechanical properties, in particular the indentation hardness, is typically, governed by the total number of repetitions or the repetition rate of the at least one single electromagnetic pulse. Additionally or as an alternative, to the previous mentioned four options, the adjustment or the modification or the tunability for example of the mechanical properties, in particular the indentation hardness, is typically, governed by the number of micro-pulses within the at least one single electromagnetic pulse. Additionally or as an alternative, to the previous mentioned five options, the adjustment or the modification or the tunability for example of the mechanical properties, in particular the indentation hardness, is typically, governed by the average duty cycle of the at least one single electromagnetic pulse. Furthermore, the adjustment or the modification or the tunability for example of the mechanical properties, in particular the indentation hardness, is most typically, governed by the total dose delivered by at least one single electromagnetic pulse, the total process duration, the wavelength of each single electromagnetic pulse, the total number of repetitions of the at least one single electromagnetic pulse, the number of micro-pulses within a one single electromagnetic pulse, and the repetition rate of the at least one single electromagnetic pulse. For example, an indentation hardness of the coated lens ranging from 100 MPa to 2 GPa, typically, from 250 MPa to 1 GPa can be attained using at least one single electromagnetic pulse. typically, the before mentioned ranges with respect to the indentation hardness are achieved without compromising on the yellowing. In addition, at least one single electromagnetic pulse can be also applied such that the optical properties of the optical lens substrate is less or not affected compared to direct application of heat at a temperature below or at the threshold temperature of the optical lens substrate or such that the value for the yellowing is in a range of 1 to 8 while still achieving a value for the indentation hardness in the range of 100 MPa to 2 GPa. When using a thermal drying and sintering and/or hardening and/or curing process by direct application of heat at a temperature below or at the threshold temperature of the optical lens substrate, for an identical type of coating precursor material values for the indentation hardness between 800 MPa and 2 GPa could not be achieved, even not with an increase in time. So, an extreme target value for at least one mechanical and/or at least one optical property and/or at least one functional property can be obtained by drying and hardening and/or sintering and/or curing of at least one coating precursor material on at least one surface of the uncoated or precoated optical lens substrate by using at least one single electromagnetic pulse. These extreme target values are typically, higher or lower up to 300 times, typically, in a range from 1 time to 275 times, further typically, in a range from 1.05 times to 250 times, more typically, in a range from 1.1 times to 225 times, and more typically, in a range from 1.15 times to 200 times, each as compared to the highest or lowest achievable target values by a thermal drying and sintering and/or hardening and/or curing process with the direct application of heat. These extreme target values for mechanical properties are further typically, higher or lower up to 250 times, typically, in a range from 1.05 times to 225 times, further typically, in a range from 1.1 times to 200 times, more typically, in a range from 1.15 times to 175 times, and more typically, in a range from 1.2 times to 150 times, each as compared to the highest or lowest achievable target values by a thermal drying and sintering and/or hardening and/or curing process with the direct application of heat. These extreme target values for optical properties are further typically, higher or lower up to 200 times, typically, in a range from 1 time to 175 times, further typically, in a range from 1.1 times to 150 times, more typically, in a range from 1.2 times to 125 times, and more typically, in a range from 1.3 times to 100 times, each as compared to the highest or lowest achievable target values by a thermal drying and sintering and/or hardening and/or curing process with the direct application of heat. These extreme target values for optical properties are further typically, higher or lower up to 300 times typically, in a range from 1.02 times to 290 times, further typically, in a range from 1.04 times to 280 times, more typically, in a range from 1.06 times to 270 times, and more typically, in a range from 1.06 times to 260 times, each as compared to the highest or lowest achievable target values by a thermal drying and sintering and/or hardening and/or curing process. By applying at least one electromagnetic pulse to at least one coating precursor material, the indentation hardness of the coated lens may be adjusted or modified or tuned within the before mentioned range without any increase in time, but typically, within the total process duration ranges mentioned above.

Although throughout the application it is distinguished between the use of a single electromagnetic pulse and a thermal curing process, the application of a single electromagnetic pulse does not exclude a precuring step being a thermal precuring step, i.e., the direct application of heat in a furnace or an oven. As such a thermal precuring step is not mandatory, the use of a single electromagnetic pulse for the conversion of at least one coating precursor material into at least one coating has the advantage that a precuring step can be omitted. With the application of at least one single electromagnetic pulse to convert at least one coating precursor material into at least one coating the precuring step typically, is an integral part of the drying and curing and/or hardening and/or sintering step.

For a specified total process duration below 5 minutes, typically, in a range from 0.5 second to 5 minutes, further typically, in a range from 5 seconds to 4 minutes, more typically, in a range from 10 seconds to 3 minutes and most typically, in a range from 15 seconds to 2 minutes, extreme target values of the at least one mechanical and/or at least one optical property and/or at least one functional property can be achieved by drying and hardening and/or sintering and/or curing of at least one coating precursor material on at least one surface of the uncoated or precoated optical lens substrate using at least one single electromagnetic pulse, the target values being typically, up to 1000 times higher or lower, further typically, in a range from 1 time to 900 times, further typically, in a range from 1.05 times to 800 times, more typically, in a range from 1.1 times to 700 times, and more typically, in a range from 1.15 times to 600 times, each as compared to extreme target values achievable by a thermal drying and sintering and/or hardening and/or curing process using direct heat.

For a specified total process duration below 5 minutes, typically, in a range from 0.5 second to 5 minutes, further typically, in a range from 5 seconds to 4 minutes, more typically, in a range from 10 seconds to 3 minutes and most typically, in a range from 15 seconds to 2 minutes, extreme target values of the at least one mechanical property can be achieved by drying and hardening and/or sintering and/or curing of at least one coating precursor material on at least one surface of the uncoated or precoated optical lens substrate using at least one single electromagnetic pulse, the target values being more typically, up to 500 times higher or lower, further typically, in a range from 1 to 400, further typically, in a range from 1.05 to 300, more typically, in a range from 1.1 to 200, and more typically, in a range from 1.15 to 100, each as compared to extreme target values achievable by a thermal drying and sintering and/or hardening and/or curing process using direct heat.

For a specified total process duration below 5 minutes, typically, in a range from 0.5 second to 5 minutes, further typically, in a range from 5 seconds to 4 minutes, more typically, in a range from 10 seconds to 3 minutes and most typically, in a range from 15 seconds to 2 minutes, extreme target values of the at least one optical property can be achieved by drying and hardening and/or sintering and/or curing of at least one coating precursor material on at least one surface of the uncoated or precoated optical lens substrate using at least one single electromagnetic pulse, the target values being more typically, up to 400 times higher or lower, further typically, in a range from 1 time to 375 times, further typically, in a range from 1.05 times to 350 times, more typically, in a range from 1.1 times to 325 times, and more typically, in a range from 1.15 times to 300 times, each as compared to extreme target values achievable by a thermal drying and sintering and/or hardening and/or curing process using direct heat.

For a specified total process duration below 5 minutes, typically, in a range from 0.5 second to 5 minutes, further typically, in a range from 5 seconds to 4 minutes, more typically, in a range from 10 seconds to 3 minutes and most typically, in a range from 15 seconds to 2 minutes, extreme target values of the at least one functional property can be achieved by drying and hardening and/or sintering and/or curing of at least one coating precursor material on at least one surface of the uncoated or precoated optical lens substrate using at least one single electromagnetic pulse, the target values being more typically, up to 300 times higher or lower, further typically, in a range from 1 time to 275 times, further typically, in a range from 1.05 times to 250 times, more typically, in a range from 1.1 times to 225 times, and more typically, in a range from 1.15 times to 200 times, each as compared to extreme target values achievable by a thermal drying and sintering and/or hardening and/or curing process using direct heat.

The adjustment or modification or tunability typically, occurs due to the variation of the process parameters of the recipe, typically, the total dose delivered by at least one single electromagnetic pulse and/or total process duration and/or wavelength of each single electromagnetic pulse and/or the number of micro-pulses within a one single electromagnetic pulse, and/or the average duty cycle, total number of repetitions of the at least one single electromagnetic pulse or the repetition rate of the at least one single electromagnetic pulse that is used for the exposure. This has a potential to apply the same coating precursor material but obtain different mechanical properties tuned to the desired applications. Increasing the total dose delivered by at least one single electromagnetic pulse typically, increases the indention hardness of the coated lens. Increasing the total number of repetitions of the at least one single electromagnetic pulse typically, increases the indentation hardness of the coated lens as well. Increasing the total process duration of the at least one single electromagnetic pulse typically, increases the indentation hardness of the coated lens as well. Changing the wavelength of each single electromagnetic pulse and/or the number of micro-pulses within one single electromagnetic pulse and/or the average duty cycle of one single electromagnetic pulse either increases or decreases the indentation hardness of the coated lens. Increasing the total dose delivered by at least one single electromagnetic pulse, the total number of repetitions of the at least one single electromagnetic pulse and the frequency of repetition or the repetition rate of the at least one single electromagnetic pulse is typically, done stepwise in any order, typically, first increasing the total dose delivered by at least one single electromagnetic pulse, second the total number of repetitions of the at least one single electromagnetic pulse after defining the wavelength of each single electromagnetic pulse and the number of micro-pulses within one single electromagnetic pulse and the average duty cycle of one single electromagnetic pulse.

For a specified total process duration, for example below 5 minutes typically, in a range from 0.5 second to 5 minutes, further typically, in a range from 5 seconds to 4 minutes, more typically, in a range from 10 seconds to 3 minutes and most typically, in a range from 15 seconds to 2 minutes, the target value range of the at least one mechanical and/or at least one optical property and/or at least one functional property of the coated lens obtained by drying and hardening and/or sintering and/or curing of at least one coating precursor material on at least one surface of the uncoated or precoated optical lens substrate using at least one single electromagnetic pulse is typically, increased by a factor up to 25000%, further typically, in a by a factor in the range from 1% to 20000%, further typically, by a factor in the range in a range from 10% to 15000%, more typically, by a factor in the range in a range from 20% to 10000%, and more typically, in a range from 30% to 5000%, each as compared to the target value range obtained by thermal drying and sintering and/or hardening and/or curing process using the direct application of heat.

Further typically, for a specified total process duration, for example below 5 minutes typically, in a range from 0.5 second to 5 minutes, further typically, in a range from 5 seconds to 4 minutes, more typically, in a range from 10 seconds to 3 minutes and most typically, in a range from 15 seconds to 2 minutes, the target value range of the at least one mechanical property of the coated lens obtained by drying and hardening and/or sintering and/or curing of at least one coating precursor material on at least one surface of the uncoated or precoated optical lens substrate using at least one single electromagnetic pulse is typically, increased by a factor up to 20000%, further typically, in a by a factor in the range from 0.1% to 15000%, further typically, by a factor in the range in a range from 1% to 10000%, more typically, by a factor in the range in a range from 10% to 5000%, and more typically, in a range from 20% to 2500%, each as compared to the target value range obtained by thermal drying and sintering and/or hardening and/or curing process using the direct application of heat.

Further typically, for a specified total process duration, for example below 5 minutes typically, in a range from 0.5 second to 5 minutes, further typically, in a range from 5 seconds to 4 minutes, more typically, in a range from 10 seconds to 3 minutes and most typically, in a range from 15 seconds to 2 minutes, the target value range of the at least one optical property of the coated lens obtained by drying and hardening and/or sintering and/or curing of at least one coating precursor material on at least one surface of the uncoated or precoated optical lens substrate using at least one single electromagnetic pulse is typically, increased by a factor up to 5000%, further typically, in a by a factor in the range from 0.5% to 4000%, further typically, by a factor in the range in a range from 1% to 3000%, more typically, by a factor in the range in a range from 10% to 2000%, and more typically, in a range from 20% to 1000%, each as compared to the target value range obtained by thermal drying and sintering and/or hardening and/or curing process using the direct application of heat.

For a specified total process duration, for example below 5 minutes typically, in a range from 0.5 second to 5 minutes, further typically, in a range from 5 seconds to 4 minutes, more typically, in a range from 10 seconds to 3 minutes and most typically, in a range from 15 seconds to 2 minutes, the target value range of the at least one functional property of the coated lens obtained by drying and hardening and/or sintering and/or curing of at least one coating precursor material on at least one surface of the uncoated or precoated optical lens substrate using at least one single electromagnetic pulse is typically, increased by a factor up to 25000%, further typically, in a by a factor in the range from 1% to 20000%, further typically, by a factor in the range in a range from 10% to 15000%, more typically, by a factor in the range in a range from 20% to 10000%, and more typically, in a range from 30% to 5000%, each as compared to the target value range obtained by thermal drying and sintering and/or hardening and/or curing process using the direct application of heat.

The drying and hardening and/or sintering and/or curing using at least one single electromagnetic pulse converts at least one coating precursor material into at least one coating on at least one surface of an uncoated or precoated optical lens substrate. The at least one coating precursor material is typically, transparent, typically, in a wavelength range of from 100 nm to 1100 nm, more typically, of from 200 nm to 1000 nm and most typically, of from 400 nm to 900 nm. The at least one coating precursor material applied to a plano uncoated optical lens substrate has a transmittance typically, of at least 65%, more typically, at least 75% and most typically, at least 85%, each transmittance being in the before mentioned wavelength ranges. The drying and hardening and/or sintering and/or curing using at least one single electromagnetic pulse to convert at least one coating precursor material into at least one coating is possible although the uncoated optical lens substrate is transparent as well. The uncoated or precoated optical lens substrate typically, is transparent, typically, in a wavelength range of from 200 nm to 1100 nm, more typically, of from 350 nm to 1000 nm and most typically, of from 390 nm to 800 nm. In case of a clear lens, the plano or corrective uncoated optical lens substrate each has a transmittance typically, of at least 70%, more typically, at least 80% and most typically, 90%, each transmittance typically, being in the before mentioned wavelength ranges. In case of a tinted lens, the plano or corrective uncoated optical lens substrate each has a transmittance typically, in a range of 10% to 90%, again the transmittance typically, being in the before mentioned wavelength ranges. The transmittance of the at least one coating precursor material applied to i) a clear or tinted plano uncoated optical lens substrate or to ii) a clear or tinted corrective uncoated optical lens substrate and the transmittance of the i) plano uncoated optical lens substrate or the ii) corrective uncoated optical lens substrate is typically, determined using a UV VIS spectrometer, typically, the UV VIS spectrometer Perkin Elmer 950S of Perkin Elmer.

The inventors propose that the drying and hardening and/or sintering and/or curing of the coating precursor material takes places due to the transfer of energy from the at least one single electromagnetic pulse to the uncoated or precoated optical lens substrate and to the coating precursor material. The transfer of energy occurs due to the minor differences in the transparency of the uncoated or precoated optical lens substrate and the at least one coating precursor material. For example, the uncoated or precoated optical lens substrate may have a transparency in a wavelength range of from 400 nm to 800 nm and the at least one coating precursor material may have a transparency in a wavelength range of from 100 nm to 1100 nm. The transparency of an optical lens substrate or of a coating precursor material is defined by the determined transmittance at the given wavelength, typically, in a wavelength range of from 100 nm to 1100 nm, more typically, in a wavelength range of from 200 nm to 1050 nm, more typically, of from 350 nm to 1000 nm, more typically, of from 390 nm to 850 nm and most typically, of from 400 nm to 800 nm. In this example, the visible part of the light in a wavelength range of from 400 nm to 800 nm passes through the uncoated or precoated optical lens substrate and the at least one coating precursor material with minimal or almost no absorption, typically, with a transmittance of ≥80%, further typically, of ≥90%, more typically, of ≥95% and most typically, of ≥99%, but undergoes multiple reflections at the interfaces, for example between the at least one coating precursor material and the uncoated or precoated optical lens substrate and/or from the stage on which the spectacle lens comprising the optical lens substrate and the at least one coating precursor material is placed. In addition, in this example, the wavelength range of from 100 nm to <400 nm and of from >800 nm to 1100 nm is mostly absorbed by the uncoated or precoated optical lens substrate, typically, with a transmittance of <80%, further typically, with a transmittance of ≤60%, more typically, with a transmittance of ≤40% and most typically, with a transmittance of ≤20% in these wavelength ranges. This allows a short instantaneous heating of the uncoated or precoated optical lens substrate higher than the threshold temperature of the uncoated optical lens substrate while still not damaging and/or altering the physical and/or chemical and/or mechanical and/or optical properties of the uncoated or precoated optical lens substrate. In addition, the temperature of the uncoated or precoated optical lens substrate is higher than the at least one coating precursor material, which then allows the indirect drying and curing and/or hardening and/or sintering of the at least one coating precursor material by the heated uncoated or precoated optical lens substrate. This combination of the direct energy transfer from the at least one single electromagnetic pulse and the indirect energy transfer from the heated uncoated or precoated optical lens substrates leads to the drying and curing and/or hardening and/or sintering of the at least one coating precursor material. In general, by the application of at least one single electromagnetic pulse having a wavelength range C or being in a wavelength range C to an optical lens substrate having a transmittance in a wavelength range A, the optical lens substrate comprising at least one coating precursor material having a transmittance in a wavelength range B, the minor differences regarding the transmittance of the optical lens substrate in the wavelength range A and the transmittance of the at least one coating precursor material in the wavelength range B leads to a partial absorption of the wavelengths range C which is outside the wavelength range A in the optical lens substrate. This, in turn effects the indirect drying and curing and/or hardening and/or sintering of the at least one coating precursor material on at least one surface of an uncoated or precoated optical lens substrate.

The drying and hardening and/or sintering and/or curing using at least one single electromagnetic pulse converts at least one coating precursor material on the front surface of an uncoated or precoated optical lens substrate and optionally simultaneously at least one coating precursor material on the back surface of an uncoated or precoated optical lens substrate each into at least one coating. This simultaneous drying and hardening and/or curing and/or sintering of at least one coating precursor material on opposite surfaces of an uncoated or precoated optical lens substrate is even then possible, if the at least one single electromagnetic pulse is applied only to one outermost surface of the at least one coating precursor material. typically, in case both the front surface and the back surface of the uncoated or precoated optical lens substrate comprises at least one coating precursor material, the at least one single electromagnetic pulse is applied to the front surface of the uncoated or precoated optical lens substrate comprising the at least one coating precursor material. Although the at least one single electromagnetic pulse is applied to one outermost surface of the at least one coating precursor material only, the at least one coating precursor material on the opposite surface of the uncoated or precoated optical lens material is dried and hardened and/or cured and/or sintered as well. The uncoated or precoated optical lens substrate may comprise the identical or a different at least one coating precursor material, typically, as outermost layer in the coating sequence, on the front surface and on the back surface thereof. The at least one coating precursor material may be identical or different to each other with respect to the chemical composition, to the layer thickness and/or to the type of coating precursor material. typically, the at least one coating precursor material to be dried and hardened and/or cured and/or sintered is identical with respect to the chemical composition, the layer thickness and/or the type of coating precursor material on both surfaces of the uncoated or precoated optical lens substrate. The simultaneous drying and hardening and/or curing and/or sintering of at least one coating precursor material applied on both surfaces of an uncoated or precoated optical lens substrate is thought to be due to a combination of multiple factors. The main factor is the transfer of energy from the at least one single electromagnetic pulse to both the front surface and back surface of the uncoated or precoated optical lens substrate due to minor differences in the transparency of the uncoated or precoated optical lens substrate and the at least one coating precursor material. For example, the uncoated or precoated optical lens substrate may have a transparency in a wavelength range of from 400 nm to 800 nm and the at least one coating precursor material may have a transparency in a wavelength range of from 100 nm to 1100 nm. The transparency of an optical lens substrate or of a coating precursor material is defined by the determined transmittance at the given wavelength, typically, in a wavelength range of from 100 nm to 1100 nm, more typically, in a wavelength range of from 200 nm to 1050 nm, more typically, of from 350 nm to 1000 nm, more typically, of from 390 nm to 850 nm and most typically, of from 400 nm to 800 nm. In this example, the visible part of the light of from 400 nm to 800 nm passes through the uncoated or precoated optical lens substrate and the at least one coating precursor material with minimal or almost no absorption, typically, with a transmittance of ≥80%, further typically, of ≥90%, more typically, of ≥95% and most typically, of ≥99%, but undergoes multiple reflections at all interfaces on both the front and back surface of the uncoated or precoated optical lens substrate, for example between the surface of the optical lens substrate and the at least one coating precursor material and/or from the stage on which the spectacle lens comprising the optical lens substrate and the at least one coating precursor material is placed. In addition, in this example, the wavelength range of from 100 nm to <400 nm and of from >800 nm to 1100 nm is mostly absorbed by the uncoated or precoated optical lens substrate, typically, with a transmittance of <80%, further typically, with a transmittance of ≤60%, more typically, with a transmittance of ≤40% and most typically, with a transmittance of ≤20% in these wavelength ranges. This allows a short instantaneous heating of the optical lens substrate higher than its threshold temperature while still not damaging and/or altering the physical and/or chemical and/or mechanical and/or optical properties of the uncoated or precoated optical lens substrate. In addition, the temperature of the uncoated or precoated optical lens substrate is higher than the temperature of the at least one coating precursor material, which allows the indirect drying and hardening and/or curing and/or sintering of the at least one coating precursor material by the so heated optical lens substrate. In addition, the back reflection of the at least one single electromagnetic pulse from the stage on which the uncoated or precoated optical lens substrate is placed also transfer energy to the back surface of the uncoated or precoated optical lens substrate and also contributes in part to the indirect drying and hardening and/or curing and/or sintering of the at least one coating precursor material on the back surface of the uncoated or precoated optical lens substrate. This combination of the direct energy transfer from the at least one single electromagnetic pulse, the indirect energy transfer from the heated uncoated or precoated optical lens substrate and the indirect energy transfer resulting from the reflection from the stage leads to the drying and hardening and/or curing and/or sintering of the at least one coating precursor material, typically, irrespective from the surface to which the at least one single electromagnetic pulse is applied. So the drying and hardening and/or curing and/or sintering of at least one coating precursor material applied to both surfaces of an uncoated or precoated optical lens substrate is possible with exposure from only one side. Generally, by the application of at least one single electromagnetic pulse having a wavelength range C' or being in a wavelength range C' to an optical lens substrate having a transmittance in a wavelength range A', the optical lens substrate comprising at least one coating precursor material on the front surface and on the back surface thereof, each coating precursor material having a transmittance in a wavelength range B', the minor differences regarding the transmittance of the optical lens substrate in the wavelength range A' and the transmittance of the at least one coating precursor material in the wavelength range B' leads to a partial absorption of the wavelengths range C' which is outside the wavelength range A' in the optical lens substrate. This, in turn effects the indirect simultaneous drying and curing and/or hardening and/or sintering of the at least one coating precursor material on both surfaces of an uncoated or precoated optical lens substrate.

Typically, the total process duration for drying and hardening and/or curing and/or sintering at least one coating precursor material applied to both the front surface and the back surface of an uncoated or precoated optical lens substrate is in a range typically, from 50 µs to 20 min, further typically, from 100 µs to 10 min, more typically, from 500 µs to 5 min, and most typically, from 1 ms to 3 min. Particularly preferred is a total process duration ranging from 5 ms to 2 min or from 10 ms to 30 s.

Typically, the total process duration for drying and hardening and/or sintering and/or curing at least one coating precursor material applied to both the front surface and the back surface of an uncoated or precoated optical lens substrate using at least one single electromagnetic pulse is reduced in a range from 80% to 99.99%, further typically, in a range from 85% to 99.8%, more typically, in a range from 90% to 99.5% and most typically, in a range from 95% to 99%, each as compared to the total process duration for a conventional thermal curing process using direct heating to achieve the identical target values of at least one mechanical property of the coated lens, the at least one mechanical property typically, being selected from the group consisting of hardness, scratch resistance, adhesion, delamination, crazing and water uptake of the optical substrate.

Typically, the total process duration for drying and hardening and/or sintering and/or curing at least one coating precursor material applied to both the front surface and the back surface of the uncoated or precoated optical lens substrate, typically, the uncoated optical lens substrate, using at least one single electromagnetic pulse is reduced in a range from 60% to 99.99%, further typically, in a range from 70% to 99.5%, more typically, in a range from 80% to 99% and most typically, in a range from 90% to 98.5%, each as compared to the total process duration for a conventional thermal curing process using direct heating to achieve the identical target values of at least one optical property of the coated lens, the at least one optical property typically, being selected from the group consisting of transmittance, absorbance and reflectance, typically, from wavelengths ranging from 300 nm to 780 nm, clarity and yellowing.

Typically, the total process duration for drying and hardening and/or sintering and/or curing at least one coating precursor material applied to both the front surface and the back surface of the uncoated or precoated optical lens substrate using at least one single electromagnetic pulse is reduced in a range from 5% to 99.99%, further typically, in a range from 25% to 99.5%, more typically, in a range from 50% to 99% and most typically, in a range from 75% to 98.5%, each as compared to the total process duration for a conventional thermal curing process using direct heating to achieve the identical target values of at least one functional property of the coated lens, typically, selected from the group consisting of control of the surface wetting, the photochromic performance, the surface cleanability, tint absorption or uptake, the surface tension and the chemical composition.

Further typically, the total process duration for drying and hardening and/or sintering and/or curing at least one coating precursor material applied to both the front surface and the back surface of the uncoated or precoated optical lens substrate, typically, the uncoated optical lens substrate, using at least one single electromagnetic pulse is reduced in a range from 60% to 99.99%, further typically, in a range from 70% to 99.5%, more typically, in a range from 80% to 99% and most typically, in a range from 90% to 98.5%, each as compared to the total process duration for a conventional thermal curing process using direct heating to achieve the identical target values of at least one optical property of the coated lens, and to achieve the identical target values of at least one mechanical property of the coated lens, the at least one mechanical property typically, being selected from the group consisting of hardness, scratch resistance, adhesion, delamination, crazing and water uptake of the optical lens substrate and/or to achieve the identical target values of at least one functional property of the coated lens, the at least one functional property being selected from the group consisting of control of the surface wetting, the photochromic performance, the surface cleanability, tint absorption or uptake, the surface tension and the chemical composition.

The drying and hardening and/or sintering and/or curing using at least one single electromagnetic pulse may further convert at least two coating precursor materials applied to the identical surface, e.g., the front surface, of an uncoated or precoated optical lens substrate and optionally simultaneously at least one coating precursor material applied to the opposite surface, for example the back surface, of the uncoated or precoated optical lens substrate each into a coating. One of the at least two coating precursor materials, both being applied to one of the surfaces of the uncoated or precoated optical lens substrate, may be identical or different from the optional at least one coating precursor material applied to the opposite surface of the uncoated or precoated optical lens substrate. The coating precursor materials may be identical or different from each other with respect to their chemical composition, the layer thickness and/or to the type of coating precursor material. The differences in the absorption of two or more coating precursor material in a wavelength range of from 50 nm to 1200 nm, more typically, from 100 to 1100 nm, and most typically, from 200 nm to 1000 nm, and/or reflections at the interfaces may contribute to the drying and hardening and/or sintering and/or curing of at least two coating precursor materials using at least one single electromagnetic pulse. Adjustment or modification or tunability of at least one mechanical property and/or at least one optical property and/or functional property of the coating precursor material may be possible only one at a time on one or both surfaces of the uncoated or precoated optical lens substrates, more than one at a time on one or both surfaces of the uncoated or precoated optical lens substrates by drying and hardening and/or sintering and/or curing using at least one single electromagnetic pulse.

Typically, the total process duration for drying and hardening and/or curing and/or sintering at least two coating precursor materials applied to the identical surface of an uncoated or precoated optical lens substrate is in a range typically, from 20 µs to 20 min, further typically, from 50 µs to 15 min, more typically, from 100 µs to 10 min, more typically, from 110 µs to 5 min, and most typically, from 120 µs to 2.5 min.

Further typically, the total process duration for drying and hardening and/or curing and/or sintering at least two coating precursor materials applied to the identical surface of an uncoated or precoated optical lens substrate and simultaneously for drying and hardening and/or curing and/or sintering at least one coating precursor material applied to the opposite surface of an uncoated or precoated optical lens substrate is within a range typically, from 20 µs to 25 min, further typically, from 40 µs to 20 min, more typically, from 60 µs to 15 min, more typically, from 80 µs to 10 min, more typically, from 100 µs to 5 min, and most typically, from 120 µs to 2.5 min.

The drying and hardening and/or curing and/or sintering using at least one electromagnetic pulse typically, converts at least one coating precursor material into at least one coating, irrespective of the surface topography of the coating precursor material. The surface topography of the at least one coating precursor material typically, corresponds to the surface topography of the uncoated or precoated optical lens substrate. The drying and hardening and/or curing and/or sintering using at least one electromagnetic pulse may or may not alter the surface topography of the coating precursor material.

For any comparison with a thermal drying and hardening and/or curing and/or sintering process, coated lenses based on the identical uncoated or precoated optical lens substrates and on the identical at least one coating precursor material are considered.

The expression "coating precursor material" means that the material is still convertible, for example, by chemical reaction, such as polymerizing, by curing, sintering and/or hardening, into a polymerized, hardened, sintered and/or cured coating or layer, respectively. The terms "layer" and "coating" are used interchangeably. The adjustment or the modification or the tunability of the respective properties of the coated lens typically, results in at least one coating precursor material of the coated lens being dried and cured and/or sintered and/or hardened, i.e., the at least one coating precursor material typically, is converted into at least one coating.

A coating precursor material can be, for example, a monomeric and/or oligomeric and/or pre-polymeric organic material capable to be cured and/or hardened and/or sintered and/or polymerized, for example, to a thermoset or thermoplastic or three-dimensional crosslinked coating. A coating precursor material can also be an inorganic/organic material which is capable to be densified and/or crosslinked and/or polymerized and/or cured and/or hardened and/or sintered to a coating, typically, a sol-gel coating. A coating precursor material can also be an inorganic material or an organic material which is capable to be densified and/or polymerized and/or crosslinked and/or cured and/or hardened and/or sintered to a coating, for example due to a chemical condensation process, for example, with the elimination of water or alcohol.

The at least one coating precursor material typically, does not comprise a photoinitiator. The at least one coating precursor material typically, is thermally curable, i.e., is curable by the direct application of heat.

Typically, the at least one coating precursor material is dried and hardened and/or cured and/or sintered on top of an uncoated or precoated optical lens substrate, the optical lens substrate and the precoating of the optical lens substrate being cured. The optical lens substrate and the precoating of the optical lens substrate are not to be dried and hardened and/or cured and/or sintered by the application of at least one single electromagnetic pulse.

The at least one coating precursor material is typically, selected from the group consisting of at least one hard coating precursor material, at least one primer coating precursor material and at least one photochromic coating precursor material.

The at least one hard coating precursor material typically, comprises

A)a) at least one silane derivative of the formula (I) $Si(OR^1)(OR^2)(OR^3)(OR^4)$, wherein $R^1$, $R^2$, $R^3$ and $R^4$, which may be the same or different, are selected from an alkyl, an acyl, an alkyleneacyl, a cycloalkyl, an aryl or an alkylenearyl group, each of which may optionally be substituted, and/or b) at least one hydrolysis product of the at least one silane derivative of the formula (I), and/or c) at least one condensation product of the at least one silane derivative of the formula (I), and/or d) any mixture of the components a) to c) thereof;

B)a) at least one silane derivative of the formula (II) $R^6R^7_{3-n}Si(OR^5)_m$, in which $R^5$ is selected from an alkyl, an acyl, an alkyleneacyl, a cycloalkyl, an aryl or an alkylenearyl group, each of which may optionally be substituted, $R^6$ is an organic radical containing an epoxide group, $R^7$ is selected from an alkyl, a cycloalkyl, an aryl or an alkylenearyl group, each of which may optionally be substituted, n is 2 or 3; and/or b) at least one hydrolysis product of the at least one silane derivative of the formula (II), and/or c) at least one condensation product of the at least one silane derivative of the formula (II), and/or d) any mixture of the components a) to c) thereof;

C) at least one colloidal inorganic oxide, hydroxide, oxide hydrate, fluoride and/or oxyfluoride;

D) at least one epoxide compound having at least two epoxide groups; and

E) at least one catalyst system comprising at least one Lewis acid and at least one thermolatent Lewis acid-base adduct.

The term "at least one hydrolysis product" of the at least one silane derivative of the formula (I) or (II) respectively expresses the fact that the at least one silane derivative of the formula (I) or of the formula (II) each has already been at least partly hydrolyzed to form silanol groups.

The term "at least one condensation product" of the at least one silane derivative of the formula (I) or of the formula (II) respectively expresses the fact that a certain degree of crosslinking has also already taken place through condensation reaction of the silanol groups.

The at least one silane derivative of the formula (I) may be selected from tetramethoxysilane, tetraethoxysilane, tetrapropoxysilane, tetraisopropoxysilane, tetrabutoxysilane, tetraisobutoxysilane, tetrakis(methoxyethoxy)silane, tetrakis(methoxypropoxy)silane, tetrakis(ethoxyethoxy)silane, tetrakis(methoxyethoxyethoxy)silane, trimethoxyethoxysilane, dimethoxydiethoxysilane or mixtures thereof.

The at least one silane derivative of the formula (II) may be selected from 3-glycidoxymethyltrimethoxysilane, 3-glycidoxypropyltrihydroxysilane, 3-glycidoxypropyldimethylhydroxysilane, 3-glycidoxypropyldimethylethoxysilane, 3-glycidoxypropylmethyldiethoxysilane, 3-glycidoxypropyltrimethoxysilane, 3-glycidoxypropyltriethoxysilane, 3-glycidoxypropyldimethoxymethylsilane, 3-glycidoxypropyl di ethoxymethyl silane, 2-(3,4-epoxycyclohexyl)ethyltrimethoxysilane or mixtures thereof.

The at least one colloidal inorganic oxide may be selected from silicon dioxide, titanium dioxide, zirconium dioxide, tin dioxide, antimony oxide, aluminum oxide or mixtures thereof.

The mean particle diameter of the at least one colloidal inorganic oxide, hydroxide, fluoride or oxyfluoride is typically, selected such that the transparency of the at least one coating is not affected. typically, the at least one colloidal inorganic oxide, hydroxide, oxide hydrate, fluoride and/or oxyfluoride has a mean particle diameter in the range of from 2 nm to 150 nm, even more typically, of from 2 nm to 70 nm. The mean particle diameter is determined typically, by means of dynamic light scattering. The at least one colloidal inorganic oxide, hydroxide, oxide hydrate, fluoride or oxyfluoride contributes to an increase in scratch resistance through incorporation into the existing network. In addition, selection of at least one colloidal inorganic oxide, hydroxide, oxide hydrate, fluoride or oxyfluoride allows the refractive index of the at least one coating to be matched to the refractive index of the optical lens substrate.

The at least one epoxide compound having at least two epoxide groups is typically, a polyglycidyl ether compound, more typically, a diglycidyl ether or triglycidyl ether compound.

The at least one catalyst system comprising at least one Lewis acid and at least one thermolatent Lewis acid-base adduct enables very homogeneous crosslinking and hence also consistent high strength over the entire layer thickness of the at least one coating. The term "Lewis acid" relates to an electrophilic electron pair acceptor compound, the term "Lewis base" is understood to mean an electron pair donor compound. The at least one Lewis acid is typically, one which have catalytic activity even at relatively low temperatures, for example at room temperature. The at least one Lewis acid may be selected from ammonium salts, metal salts (especially of metals from one of groups 1 (i.e., alkali metal salts), 2 (i.e., alkaline earth metal salts) or 13 (Typically, Al or B) of the periodic table of the elements, halides of an element of group 13 of the periodic table of the elements (especially $AlX_3$ or $BX_3$ where X is chlorine or fluorine), organic sulphonic acids and amine salts thereof, alkali metal or alkaline earth metal salts, for example alkali metal or alkaline earth metal salts of carboxylic acids, fluoride salts, organotin compounds, or a mixture thereof. Preferred metal salts of metals from one of groups 1, 2 and 13 of the periodic table of the elements are, for example, perchlorates or carboxylates (i.e., carboxylic salts). Preferred Lewis acids are, for example, ammonium perchlorate, magnesium perchlorate, sulphonic acids and salts thereof, such as trifluoromethanesulphonic acids and salts thereof.

The at least one Lewis acid-base adduct is understood to mean a compound which has catalytic activity (with regard to the chemical reaction in question) only at relatively high temperatures, while it is essentially still catalytically inactive at room temperature. Only through the supply of sufficient thermal energy or heat is a thermolatent catalyst compound converted to a catalytically active state.

The at least one silane derivative of the formula (I) and/or the at least one hydrolysis product of the silane derivative of the formula (I) and/or the at least one condensation product of the silane derivative of the formula (I) is/are typically, present in the at least one coating precursor material in an amount of 5% by weight to 50% by weight, more typically, of 5% by weight to 20% by weight. The amounts given before applies with regard to the at least one silane derivative of the formula (I), with regard to the at least one hydrolysis product of the formula (I), with regard to the at least one condensation of the formula (I) or with regard to any mixture thereof. The amounts given before applies as well with regard to a mixture of silane derivatives of the formula (I), with regard to a mixture of hydrolysis products of the at least one silane derivative of the formula (I), with regard to a mixture of condensation products of the at least one silane derivative of the formula (I) or with regard to any mixture thereof.

The at least one silane derivative of the formula (II) and/or the at least one hydrolysis product of the silane derivative of the formula (II) and/or the at least one condensation product of the silane derivative of the formula (II) is/are typically, present in the at least one coating precursor material in an amount of 5% by weight to 50% by weight, more typically, of 5% by weight to 20% by weight. The amounts given before applies with regard to the at least one silane derivative of the formula (II), with regard to the at least one hydrolysis product of the formula (II), with regard to the at least one condensation of the formula (II) or with regard to any mixture thereof. The amounts given before applies as well with regard to a mixture of silane derivatives of the formula (II), with regard to a mixture of hydrolysis products of the at least one silane derivative of the formula (II), with regard to a mixture of condensation products of the at least one silane derivative of the formula (II) or with regard to any mixture thereof.

The weight ratio of the at least one silane derivative of the formula (I), the at least one hydrolysis product of the silane derivative of the formula (I) and/or the at least one condensation product of the silane derivative of the formula (I) relative to the at least one silane derivative of the silane derivative of the formula (II), the at least one hydrolysis product of the silane derivative of the formula (II) and/or the at least one condensation product of the silane derivative of the formula (II) is typically, in the range of from 95/5 to 5/95, more typically, in the range of from 70/30 to 30/70, even more typically, in the range of from 60/40 to 40/60.

The at least one colloidal inorganic oxide, hydroxide, fluoride and/or oxyfluoride is typically, present in an amount of 5% by weight to 50% by weight, more typically, of 5% by weight to 25% by weight, based on the total weight of the hard coating precursor material. The amounts mentioned before apply for one type of colloidal oxide, one type of hydroxide, one type of fluoride, one type of oxyfluoride, for a mixture thereof, for a mixture of different colloidal oxides, a mixture of different colloidal hydroxides, a mixture of different colloidal fluorides, a mixture of different colloidal oxyfluorides or for a mixture thereof. The mixture of different colloidal oxides, hydroxides, fluorides or oxyfluorides may for comprises one type of each in different particle sizes or different types of each in the same or in a different particle size.

The at least one epoxide compound having at least two epoxide groups is typically, present in an amount of 0.1% by weight to 10% by weight, more typically, of 0.5% by weight to 10% by weight, based on the total weight of the at least one hard coating precursor material. The amounts given before apply with regard to one type of epoxide compound or to a mixture of different types of epoxide compounds.

The at least one catalyst system is typically, present in an amount in the range from 0.01% by weight to 5% by weight, more typically, in the range from 0.1% by weight to 3% by weight, based on the total weight of the hard coating precursor material.

The weight ratio of at least one Lewis acid to the at least one thermolatent Lewis acid-base adduct is typically, in the range from 20/1 to 1/2, more typically, from 5/1 to 2/1.

The coating precursor material typically, comprises at least one solvent comprising an alcohol, an ether, an ester or water. In case the at least one solvent comprises two different solvents, the boiling point of the first solvent Si and the boiling point of the second solvent S2 is either S1/S2≥1.2 or S1/S2≤0.8. Further, in case the at least one solvent comprises two different solvents, the weight ratio of the first solvent to the second solvent is typically, in the range of from 5 to 0.01, more typically, in the range of from 2 to 0.2.

Typically, water is present in an amount of 2% by weight to 15% by weight, based on the total weight of the hard coating precursor material.

The components of the at least one coating precursor material resulting in at least one hard coating are used in that they add to 100% by weight.

The at least one hard coating precursor material resulting in at least one hard coating is typically, applied to at least one coated or uncoated surface of the uncoated or precoated optical lens substrate by dip coating or by spin coating.

The use of the at least one hard coating precursor material comprising the components (A) to (E), i.e., at least one silane derivative of formula (I), at least one hydrolysis product and/or at least one condensation product thereof, at least one second silane derivative of formula (II), at least one hydrolysis product and/or at least one condensation product thereof, at least one colloidal inorganic oxide, hydroxide, fluoride or oxyfluoride, at least one epoxide compound and at least one catalyst system, on the application of sufficient thermal energy enables the production of at least one hard coating having very good adhesive strength on different optical lens substrates, having a high hardness, being of high scratch resistance and showing a low tendency to crack formation on different optical lens substrates. In addition, the direct application of heat is at a sufficient level that initiates the catalytic activity of the at least one Lewis acid-base but below a threshold temperature that the optical properties and/or the mechanical properties and/or the functional properties of neither the uncoated or precoated optical lens substrate nor of the coated lens are deteriorated due to thermal effects. Therefore, by the direct application of heat, the coating precursor material enters an equilibrium state and cannot be further tuned or adjusted or modified. The already very good mechanical and/or optical properties and/or functional properties of the at least one hard coating are tunable or adjustable or modifiable with the application of at least one single electromagnetic pulse. The adjustment or the modification or the tunability of at least one mechanical property and/or of at least one optical property or of at least one functional property is typically, given by using at least two recipes that allow to change at least one specific target value within a given range of the selected mechanical and/or optical and/or functional property or properties. The at least two recipes may comprise at least one of the following process parameters: the total process duration, the wavelength of each single electromagnetic pulse, the total dose delivered by at least one single electromagnetic pulse, the number of micro-pulses within a one single electromagnetic pulse, the average duty cycle, the total number of repetitions of the at least one single electromagnetic pulse or the repetition rate of the at least one single electromagnetic pulse. Variation of at least one of the process parameters provides a different recipe, which allows to select a different value of the indentation hardness of the coated lens.

The at least one hard coating precursor material more typically, comprises

A) a) at least one silane derivative of the formula (III) $R^1R^2_{3-n}Si(OR^3)_n$, wherein $R^1$ comprises an alkyl group, a cyclo alkyl group, an acyl group, an aryl group or an hetero aryl group, each of which may be substituted, $R^2$ is an organic rest comprising an epoxide group, $R^3$ comprises an alkyl group, a cyclo alkyl group, an aryl group or a hetero aryl group, each of which may be substituted, n=2 or 3, and/or b) at least one hydrolysis product of the silane derivative of the formula (III), and/or c) at least one condensation product of the silane derivative of the formula (III), and/or d) any mixture of components a) to c);

B) at least one colloidal inorganic oxide, hydroxide, oxide hydrate, fluoride and/or oxyfluoride;

C) at least one epoxy component comprising at least two epoxy groups; and

D) at least one catalyst system comprising at least one Lewis acid and at least one thermolatent Lewis base-adduct.

The term "at least one hydrolysis product" of the at least one silane derivative of the formula (III) the fact that the at least one silane derivative of the formula (III) has already been at least partly hydrolyzed to form silanol groups.

The term "at least one condensation product" of the at least one silane derivative of the formula (III) the fact that a certain degree of crosslinking has also already taken place through condensation reaction of the silanol groups.

The at least one silane derivative of the formula (III) and/or the at least one hydrolysis product of the silane derivative of the formula (III) and/or the at least one condensation product of the at least one silane derivative of the formula (III) and/or any mixture thereof is/are present in the at least one hard coating precursor material in a total amount in the range typically, of from 9% by weight to 81% by weight, further typically, of from 13% by weight to 76% by weight, more typically, of from 19% by weight and most typically, of from 23% by weight to 66% by weight, each based on the total weight of the at least one hard coating precursor material. The amounts given before applies with regard to the at least one silane derivative of the formula (III), with regard to the at least one hydrolysis product of the formula (III), with regard to the at least one condensation of the formula (III) or with regard to any mixture thereof. The amounts given before apply as well with regard to a mixture of silane derivatives of the formula (III), with regard to a mixture of hydrolysis products of the at least one silane derivative of the formula (III), with regard to a mixture of condensation products of the at least one silane derivative of the formula (III) or with regard to any mixture thereof.

The at least one colloidal inorganic oxide, hydroxide, oxide hydrate, fluoride and/or oxyfluoride is/are present in the at least one hard coating precursor material in a total amount in the range typically, of from 3% by weight to 60% by weight, further typically, of from 6% by weight to 58% by weight, more typically, of from 9% by weight to 57% by weight and most typically, of from 13% by weight to 55% by weight, each based on the total weight of the coating precursor material. The amounts given before apply with regard to one type of colloidal inorganic oxide, one type of colloidal inorganic hydroxide, one type of colloidal inorganic oxide hydrate, one type of colloidal inorganic fluoride, one type of colloidal inorganic oxyfluoride and any mixture thereof. The amounts given before apply as well with regard to a mixture of different colloidal inorganic oxides, a mixture of different colloidal inorganic hydroxides, a mixture of different colloidal inorganic oxide hydrates, a mixture of different colloidal inorganic fluorides, a mixture of different colloidal inorganic oxyfluorides or any mixture thereof. The mentioned mixtures may include each different particles sizes or different types of colloidal inorganic oxides, hydroxides, oxide hydrates, fluorides and/or oxyfluorides.

The at least one epoxide compound comprising at least two epoxide groups is present in the at least one hard coating precursor material in an amount in the range typically, of from 0.01% by weight to 14% by weight, further typically, of from 0.07% by weight to 11% by weight, more typically, of from 0.1% by weight to 6% by weight and most typically, of from 0.2% by weight to 13% by weight, each based on the total weight of the at least one hard coating precursor material. The amount given before apply with regard to one type of epoxide compound as well as with regard to a mixture of different epoxide compounds.

The at least one catalyst system comprising at least one Lewis acid and at least one thermolatent Lewis base-adduct is present in the at least one hard coating precursor material in an amount in the range typically, of from 0.04% by weight to 4% by weight, further typically, of from 0.1% by weight to 3% by weight, more typically, of from 0.2% by weight to 2% by weight and most typically, 0.3% by weight to 1% by weight, each based on the total weight of the at least one hard coating precursor material. The weight ratio of the at least one Lewis acid to the at least one thermolatent Lewis base-adduct is typically, in a range of from 20:1 to 2:1, further typically, of from 18:1 to 1:2, more typically, of from 13:1 to 1:1 and most typically, of from 6:1 to 1:1.

The at least one hard coating precursor material may comprise at least one organic solvent and/or water. The components of the at least one hard coating precursor material resulting in at least one hard coating are used in that they add to 100% by weight.

As at least one silane derivate of the formula (III) 3-glycidoxymethyltrimethoxysilane, 3-glycidoxypropyltrihydroxysilane, 3-glycidoxypropyldimethylhydroxysilane, 3-glycidoxypropyldimethylethoxysilane, 3-glycidoxypropylmethyldiethoxysilane, 3-glycidoxypropyltrimethoxysilane, 3-glycidoxypropyltriethoxysilane, 3-glycidoxypropyldimethoxymethylsilane, 3-glycidoxypropyldiethoxymethylsilane and/or 2-(3,4-epoxycyclohexyl)ethyltrimethoxysilane for example may be used in the at least one coating precursor material. typically, 3-glycidoxypropyltrimethoxysilane and/or 3-glycidoxypropyltriethoxysilane is/are used as silane derivative of the formula (III).

The at least one colloidal inorganic oxide, hydroxide, oxide hydrate may be a metal oxide, metal hydroxide, metal oxide hydrate, where the metal ions of the metal oxide, metal hydroxide, metal oxide hydrate comprise or are the metals of titanium, typically, $TiO_2$; of silicon, typically, $SiO_2$; of zirconium, typically, $ZrO_2$, of tin, typically, $SnO_2$; of antimony, typically, $Sb_2O_3$; of aluminum, typically, $Al_2O_3$ or AlO(OH); and/or mixed oxides and/or mixtures thereof. typically, the colloidal inorganic oxide, hydroxide, oxide hydrate is a metal oxide, metal hydroxide, metal oxide hydrate, wherein the metal ions of the metal oxide, metal hydroxide, metal oxide hydrate comprise or are metals of titanium, silicon, zirconium or mixtures thereof, further typically, of silicon. Further typically, the at least one colloidal inorganic oxide, hydroxide, oxide hydrate forms core-shell particles. In such core-shell particles the core comprises typically, a metal oxide, metal hydroxide, metal oxide hydrate, wherein the metal ions of the metal oxide, metal hydroxide, metal oxide hydrate comprise or are metals of titanium, typically, $TiO_2$, and/or of zirconium, typically, $ZrO_2$ and the shell comprises typically, a metal oxide, metal hydroxide, metal oxide hydrate, wherein the metal ions of the metal oxide, metal hydroxide, metal oxide hydrate comprise or are silicon, typically, $SiO_2$. As colloidal inorganic fluoride magnesium fluoride may be used. The at least one colloidal oxide, hydroxide, oxide hydrate, fluoride and/or oxyfluoride has a mean particle size in the range typically, of from 3 nm to 70 nm, further typically, of from 6 nm to 64 nm, more typically, of from 8 nm to 56 nm and most typically, 9 nm to 52 nm.

As at least one epoxide compound comprising at least two epoxide compounds digylcidyl ether, ethylenglycoldiglycidyl ether, propylenglycoldiglycolglycidyl ether, 1,4-butandioldiglycidyl ether, 1,6-hexandioldiglycidyl ether, trimethylolpropantriglycidyl ether, triglycidylglycerin and/or trimethylolethantriglycidylether for example may be used in the at least one coating precursor material. typically, the at least epoxide compound comprises trimethylolpropantriglycidyl ether, butandioldiglycidyl ether and/or 1,6-hexandiol-diglycidyl ether.

As at least one Lewis acid ammonium perchlorate, magnesium perchlorate, sulfonic acids and/or salts of sulfonic acids, such as trifluoromethane sulfonic acid and/or salts thereof, for example may be used in the at least one catalyst system.

As at least one Lewis base-adduct a metal complex compound, such as aluminum acetylacetonate, iron acetylacetonate and/or zinc acetylacetonate, for example may be used in the at least one catalyst system.

The use of the at least one hard coating precursor material comprising the components (A) to (D), i.e., at least one silane derivative of the formula (III), at least one hydrolysis product and/or at least one condensation product thereof, least one colloidal inorganic oxide, hydroxide, oxide hydrate, fluoride or oxyfluoride, at least one epoxide compound and at least one catalyst system, on the application of sufficient thermal energy enables the production of at least one hard coating having very good adhesive strength on different optical lens substrates, having a high hardness, being of high scratch resistance and showing a low tendency to crack formation on different optical lens substrates. In addition, the direct application of heat is at a sufficient level that initiates the catalytic activity of the at least one Lewis acid-base but below a threshold temperature that the optical properties and/or the mechanical properties and/or the functional properties of neither the uncoated or precoated optical lens substrate nor of the coated lens are deteriorated due to thermal effects. Therefore, by the direct application of heat, the coating precursor material enters an equilibrium state and cannot be further tuned or adjusted or modified. The already very good mechanical and/or optical properties of the at least one hard coating are tunable or adjustable or modifiable with the application of at least one single electromagnetic pulse. The adjustment or the modification or the tunability of at least one mechanical property and/or of at least one optical property or of at least one functional property is typically, given by using at least two recipes that allow to change at least one specific target value within a given range of the selected mechanical and/or optical and/or functional property or properties. The at least two recipes may comprise at least one of the following process parameters: the total process duration, the wavelength of each single electromagnetic pulse, the total dose delivered by at least one single electromagnetic pulse, the number of micropulses within a one single electromagnetic pulse, the average duty cycle, the total number of repetitions of the at least one single electromagnetic pulse or the repetition rate of the at least one single electromagnetic pulse. Variation of at least one of the process parameters provides a different recipe, which allows to select a different value of the indentation hardness of the coated lens.

The at least one hard coating typically, has an average thickness in the range of from 0.6 µm to 7.1 µm, further typically, in the range of from 0.8 µm to 6.6 µm, more typically, in the range of from 1.1 µm to 5.8 µm and most typically, of from 1.6 µm to 4.9 µm. The average thickness of the at least one hard coating is typically, determined by the measurement of the spectral reflectivity and/or the spectral transmissivity.

The at least one hard coating precursor material resulting in at least one hard coating is typically, applied to at least one coated or uncoated surface of the optical lens substrate by dip coating or by spin coating.

The at least one primer coating precursor material may further typically, comprise
i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion, at least one aqueous aliphatic, cycloaliphatic, aromatic or heteroaromatic polyester dispersion, typically, at least one aqueous aliphatic polyurethane dispersion or at least one aqueous aliphatic polyester dispersion and more typically, at least one aqueous aliphatic polyurethane dispersion,
ii) at least one solvent,
iii) optionally at least one additive.

The at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion, at least one aqueous aliphatic, cycloaliphatic, aromatic or heteroaromatic polyester dispersion is present in the at least one coating precursor material in a total amount typically, of 2% by weight to 38% by weight, further typically, of 4% by weight to 34% by weight, further typically, of 5% by weight to 28% by weight, more typically, of 6% by weight to 25% by weight and most typically, of 7% by weight to 21% by weight, each based on the total weight of the at least one coating precursor material. The total amount comprises the amount of only one of the dispersions mentioned before or a mixture thereof.

The at least one coating precursor material comprises typically, at least one aqueous polyurethane dispersion, wherein the polyurethane comprises a polyester unit as a spacer or the polyurethane dispersion is a polyurethane-polyurea dispersion, characterized by the occurrence of both urethane and urea groups in a macromolecular chain of the polyurethane-polyurea. Such polyurethane dispersions are described for example in WO 94/17116 A1, in particular in WO 94/17116 A1, page 7, lines 11 to 33. The aqueous polyurethane dispersion may be blended with anionically stabilized acrylic emulsions, as described in WO 94/17116 A1, in particular in WO 94/17116 A1, page 7, lines 33 to 35.

The at least one solvent is present in the at least one coating precursor material in an amount typically, of 68% by weight to 99% by weight, further preferable of 69% by weight to 98% by weight, more typically, of 81% by weight to 97% by weight and most typically, of 89% by weight to 93% by weight, each based on the total weight of the coating precursor material. The amounts mentioned before applied with regard to one type of solvent as well as with regard to a mixture of solvents.

As at least one solvent typically, at least one organic solvent with a low boiling point of <100° C. under normal pressure and at least one organic solvent with a middle boiling of 100° C. to 150° C. under normal pressure may be used. As organic solvent with a low boiling point methanol, ethanol, 1-propanol, 2-propanol, tert-butanol, acetone, diethyl ether, tert-butylmethyl ether, tetrahydrofuran, chloroform, 1,2-dichlorethane, methylene chloride, cyclohexane, ethyl acetate, n-hexane, n-heptane and/or methyl ethyl ketone for example may be used. typically, methanol, ethanol, 1-propanol and/or 2-propanol are used as solvent with a low boiling point. As organic solvent with a middle boiling point 1-methoxy-2-propanol, 1-butanol, dibutyl ether, 1,4-dioxan, 3-methyl-1-butanol, 4-hydroxy-4-methyl-2-pentanone, methylisobutylketone and/or toluoyl for example may be used. typically, 1-methoxy-2-propanol and/or 4-hydroxy-4-methyl-2-pentanone is/are used as solvent with a middle boiling point.

The weight ratio of the at least one solvent with a low boiling point to the at least one solvent with a middle boiling point is typically, 1:1, further typically, 1:1.4, more typically, 1:1.5 and most typically, 1:1.7.

As at least one solvent at least one organic solvent with a low boiling point, at least one solvent with a middle boiling point and water may be used. The weight ratio of the at least one solvent with a low boiling point to the at least one solvent with a middle boiling point to water is typically, 2:7:1, further typically, 2.5:6.5:1, further typically, 3:6:1, more typically, 3:5:1 and most typically, 3:6:1.

The at least one primer coating precursor material may comprise optionally at least one additive. The at least one additive may comprise at least one dispersing agent, at least one anti-settling agent, at least one wetting agent, at least one biocide, at least one UV-absorber or mixtures thereof.

The at least one additive may be present in the at least one coating precursor material typically, in an amount of from 0.01% by weight to 1.7% by weight, further typically, in an amount of from 0.07% by weight to 1.4% by weight, more typically, in an amount of from 0.09% by weight to 1.1% by weight and most typically, in an amount of from 0.1% by weight to 0.7% by weight, each based on the total weight of the coating precursor material. The amounts mentioned before apply with regard to one type of additive as well as with regard to a mixture of different additives.

The at least one primer coating precursor material comprising the components i) to iii), i.e., the at least one dispersion, the at least one solvent and optionally the at least one additive, after drying, hardening, curing and/or sintering with at least one electromagnetic pulse results in at least one primer coating. The optical lens substrate may be coated with at least one primer coating precursor material resulting in at least one primer coating and at least one hard coating precursor material resulting in at least one hard coating. If at least one of the surfaces of the optical lens substrate is coated with one primer coating and with one hard coating, typically, the hard coating is furthest from the coated surface of the optical lens substrate.

The average thickness of the at least one primer coating typically, lies in a range of from 300 nm to 1200 nm, further typically, in a range of from 340 nm to 1150 nm, further typically, in a range of from 390 nm to 1120 nm, more typically, in a range of from 440 nm to 1110 nm and most typically, in a range of from 470 nm to 1100 nm. The average thickness is the arithmetic average of the geometric thickness of the primer coating measured at at least three positions of the primer coating after application, drying, curing, hardening and/or sintering. typically, the average thickness of the at least one primer coating is determined by the measurement of the spectral reflectivity and/or the spectral transmissivity. typically, an optical spectrometer, such as one of the devices F20, F10-HC or F10-AR of the company Filmetrics Inc., typically, the device F10-HC, is used to determine the average thickness of the at least one primer coating. Illumination of a spectacle lens comprising an optical lens substrate and at least one primer coating with white light causes interference spectra dependent on the geometric thickness of the coating and the refractive index thereof. The path difference corresponds exactly to the multiple of the optical thickness. The thickness is typically, calculated with Fast Fourier Transformation (FFT). Alternatively, the average thickness of the primer coating may be determined with at least one scanning electron microscope photograph of a cross-section of the spectacle lens comprising an optical lens substrate and at least one primer coating. The thickness of the at least one primer coating is therefore determined in at least three positions and the arithmetic average is formed thereof.

The at least one primer coating precursor material resulting in at least one primer coating is typically, applied to at least one coated or uncoated surface of the optical lens substrate by dip coating or by spin coating.

The components of the at least one primer coating precursor material resulting in at least one primer coating are used in that they add to 100% by weight.

The at least one primer coating precursor material may further typically, comprise:
i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion, at least one aqueous aliphatic, cycloaliphatic, aromatic or heteroaromatic polyester dispersion, typically, at least one aqueous aliphatic polyurethane dispersion or at least one aqueous aliphatic polyester dispersion and more typically, at least one aqueous aliphatic polyurethane dispersion,
ii) at least one solvent,
iii) at least one base, and
iv) optionally at least one additive.

The at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion, at least one aqueous aliphatic, cycloaliphatic, aromatic or heteroaromatic polyester dispersion is present in the at least one coating precursor material in a total amount typically, of 2% by weight to 31% by weight, further typically, of 4% by weight to 26% by weight, further typically, of 5% by weight to 21% by weight, more typically, of 6% by weight to 20% by weight and most typically, of 7% by weight to 19% by weight, each based on the total weight of the at least one coating precursor material. The total amount comprises the amount of only one of the dispersions mentioned before or a mixture thereof.

The at least one coating precursor material comprises typically, at least one aqueous polyurethane dispersion, wherein the polyurethane comprises a polyester unit as a spacer or the polyurethane dispersion is a polyurethane-polyurea dispersion, characterized by the occurrence of both urethane and urea groups in a macromolecular chain of the polyurethane-polyurea. Such polyurethane dispersions are described for example in WO 94/17116 A1, in particular in WO 94/17116 A1, page 7, lines 11 to 33. The aqueous polyurethane dispersion may be blended with anionically stabilized acrylic emulsions, as described in WO 94/17116 A1, in particular in WO 94/17116 A1, page 7, lines 33 to 35. According to WO 94/17116 A1, page 7, lines 11 to 33, an aqueous polyurethane dispersion typically, is a polyurethane-polyurea, i.e., a polymer characterized by the occurrence of both urethane and urea groups in a macromolecular chain. The aqueous polyurethane dispersion may be blended with anionically stabilized acrylic emulsions as mentioned in WO 94/17166 A1, in particular in WO 94/17116 A1, page 7, lines 33 to 35.

The at least one solvent is present in the at least one coating precursor material in an amount typically, of 69% by weight to 98% by weight, further preferable of 73% by weight to 96% by weight, more typically, of 76% by weight to 94% by weight and most typically, of 79% by weight to 93% by weight, each based on the total weight of the coating precursor material. The amounts mentioned before applied with regard to one type of solvent as well as with regard to a mixture of solvents.

As at least one solvent typically, at least one organic solvent with a low boiling point of <100° C. under normal pressure and at least one organic solvent with a middle boiling of 100° C. to 150° C. under normal pressure may be used. As organic solvent with a low boiling point methanol, ethanol, 1-propanol, 2-propanol, tert-butanol, acetone, diethyl ether, tert-butylmethyl ether, tetrahydrofuran, chloroform, 1,2-dichlorethane, methylene chloride, cyclohexane, ethyl acetate, n-hexane, n-heptane and/or methyl ethyl ketone for example may be used. typically, methanol, ethanol, 1-propanol and/or 2-propanol are used as solvent with a low boiling point. As organic solvent with a middle boiling point 1-methoxy-2-propanol, 1-butanol, dibutyl ether, 1,4-dioxan, 3-methyl-1-butanol, 4-hydroxy-4-methyl-2-pentanone, methylisobutylketone and/or toluoyl for example may be used. typically, 1-methoxy-2-propanol and/or 4-hydroxy-4-methyl-2-pentanone is/are used as solvent with a middle boiling point.

The weight ratio of the at least one solvent with a low boiling point to the at least one solvent with a middle boiling point is typically, 1:1, further typically, 1:1.4, more typically, 1:1.5 and most typically, 1:1.7.

Additionally, to the at least one solvent with a low boiling point and/or to the at least one solvent with a middle boiling point, the at least one coating precursor material may comprise water. The weight ratio of the at least one solvent with a low boiling point to the at least one solvent with a middle boiling point to water is typically, 2:7:1, further typically, 2.5:6.5:1, further typically, 3:6:1, more typically, 3:5:1 and most typically, 3:6:1.

Further, the at least one coating precursor material comprises at least one base, which confers a buffering effect with respect to the pH value to the at least one primer coating resulting from the at least one coating precursor material. The at least one base typically, retards, more typically, inhibits an acidic component to come into contact with an adjacent layer, typically, an adjacent layer which is located nearer or next to the optical lens substrate. The at least one coating precursor material comprises the at least one base in an amount in the range of typically, from 0.1% by weight to 3.2% by weight, further typically, from 0.2% by weight to 2.8% by weight, further typically, from 0.3% by weight to 2.4% by weight, more typically, from 0.4% by weight to 1.9% by weight and most typically, from 0.5% by weight to 1.6% by weight, each based on the total amount of the at least one coating precursor material. The amounts given before apply to the use of one type of base as well as to the use of a mixture of different bases. The at least one coating precursor material may comprise as at least one base for example imidazole, 1-methylimidazole, 2-methylimidazole, 4-methylimidazole, 2,5-dimethylimidazole, 4-hydroxymethylimidazole, pyrazole, 1,2,3-triazole, 1,2,4-triazole, tetrazole, pentazole, pyrrole, pyrrolidine, pyridine, 4-aminopyridine, 4-methylpyridine, 4-methoxypyridine, 2,4,6-trimethylpyridine, piperidine, piperazine, triethylamine, di-isopropyl amine, di-isobutyl amine, caustic soda and/or caustic potash. typically, the at least one coating precursor material comprises at least one base selected from the group consisting of 2-methylimidazole, imidazole, 1-methylimidazole, 4-methylimidazole, 2,5-dimethylimidazole, triethylamine and caustic soda, more typically, at least one base selected from the group consisting of 2-methylimidazole, 1-methylimidazole, 4-methylimidazole and caustic soda. Most typically, the at least one coating precursor material comprises at least one base selected from the group consisting of 2-methylimidazole and 1-methylimidazole in an amount of a range from 0.1% by weight to 2% by weight, typically, from 0.3% by weight to 1.5% by weight, each based on the total amount the at least one coating precursor material. The amounts mentioned before apply to the use of a mixture of 2-methylimidazole and 1-methylimidazole as well as to the use of 2-methylimidazole or to the use of 1-methylimidazole.

The at least one coating precursor material may comprise optionally at least one additive. The at least one additive may comprise at least one dispersing agent, at least one anti-settling agent, at least one wetting agent, at least one biocide, at least one UV-absorber or mixtures thereof. The at least one additive may be present in the at least one coating precursor material typically, in an amount of from 0.01% by weight to 1.7% by weight, further typically, in an amount of from 0.07% by weight to 1.4% by weight, more typically, in an amount of from 0.09% by weight to 1.1% by weight and most typically, in an amount of from 0.1% by weight to 0.7% by weight, each based on the total weight of the coating precursor material. The amounts mentioned before apply with regard to one type of additive as well as with regard to a mixture of different additives.

The at least one primer coating precursor material comprising the components i) to iv), i.e., the at least one dispersion, the at least one solvent, the at least one base and optionally the at least one additive, after drying, hardening, curing and/or sintering with at least one electromagnetic pulse results in at least one primer coating. The optical lens substrate may be coated with at least one primer coating precursor material resulting in at least one primer coating and at least one hard coating precursor material resulting in at least one hard coating. If at least one of the surfaces of the optical lens substrate is coated with one primer coating and with one hard coating, typically, the hard coating is furthest from the coated surface of the optical lens substrate.

The average thickness of the at least one primer coating typically, lies in a range of from 300 nm to 1200 nm, further typically, in a range of from 340 nm to 1130 nm, further typically, in a range of from 390 nm to 1080 nm, more typically, in a range of from 440 nm to 1110 nm and most typically, in a range of from 470 nm to 960 nm. The average thickness is the arithmetic average of the geometric thickness of the primer coating measured at at least three positions of the primer coating after application, drying, curing, hardening and/or sintering. typically, the average thickness of the at least one primer coating is determined by the measurement of the spectral reflectivity and/or the spectral transmissivity. typically, an optical spectrometer, such as one of the devices F20, F10-HC or F10-AR of the company Filmetrics Inc., typically, the device F10-HC, is used to determine the average thickness of the at least one primer coating. Illumination of a spectacle lens comprising an optical lens substrate and at least one primer coating with white light causes interference spectra dependent on the geometric thickness of the coating and the refractive index thereof. The path difference corresponds exactly to the multiple of the optical thickness. The thickness is typically, calculated with Fast Fourier Transformation (FFT). Alternatively, the average thickness of the primer coating may be determined with at least one scanning electron microscope photograph of a cross-section of the spectacle lens comprising an optical lens substrate and at least one primer coating. The thickness of the at least one primer coating is therefore determined at at least three positions and the arithmetic average is formed thereof.

The at least one primer coating precursor material resulting in at least one primer coating is typically, applied to at least one coated or uncoated surface of the optical lens substrate by dip coating or by spin coating.

The components of the at least one primer coating precursor material resulting in at least one primer coating are used in that they add to 100% by weight.

The at least one photochromic coating precursor material may result in at least one photochromic coating after drying and curing and/or sintering and/or hardening. As photochromic coating precursor material resulting in at least one photochromic coating a coating precursor material as described in EP 1 433 814 A1, EP 1 602 479 A1, EP 1 561 571 A1, for example may be used. The at least one photochromic coating precursor material may alternatively be thermally dried and thermally cured and/or thermally sintered and/or thermally hardened by the application of direct heat.

EP 1 433 814 A1, in particular EP 1 433 814 A1, claim 1, discloses a coating precursor material comprising (1) 100 parts by weight of radically polymerizable monomers; (2) 0.01 to 20 parts by weight of an amine compound; and (3) 0.01 to 20 parts by weight of a photochromic compound, the radically polymerizable monomers including a radically polymerizable monomer having a silanol group or a group which forms a silanol group by hydrolysis, and/or a radically polymerizable monomer having an isocyanate group. According to EP 1 433 814 A1 to increase adhesion between the photochromic coating resulting from the coating precursor material described therein and an optical lens substrate, a radically polymerizable monomer having a silanol group or a group which forms a silanol group by hydrolysis or a radically polymerizable monomer having an isocyanate group is used. Usable monomers are mentioned in EP 1 433 814 A1, page 3, paragraph [0025], to page 7, paragraph [0046]. Additionally, according to EP 1 433 814 A1 the coating precursor material may include other radically polymerizable monomers. As other polymerizable monomers, a combination of a radically polymerizable monomer having a homopolymer L-scale Rockwell hardness of at least 60 ("high-hardness monomer") and a radically polymerizable monomer having a homopolymer L-scale Rockwell hardness of 40 or less ("low-hardness monomer") is typically, used to improve the characteristic properties such as solvent resistance, hardness and heat resistance of the resulting photochromic coating or the photochromic properties thereof such as color development intensity and fading speed. Examples and explanations with respect to the high-hardness monomers and the low-hardness monomers are given in EP 1 433 814 A1, page 7, paragraph [0052], to page 13, paragraph [0096]. To improve the balance of the characteristic properties such as solvent resistance, hardness and heat resistance or photochromic properties such as colour development intensity and fading speed of the resulting photochromic coating, the amount of a low-hardness monomer is typically, 5 to 70% by weight and the amount of a high-hardness monomer is typically, 5 to 95% by weight based on the total of all the other radically polymerizable monomers excluding the radically polymerizable monomer having a silanol group or a group which forms a silanol group by hydrolysis and the radically polymerizable monomer having an isocyanate group. Further, according to EP 1 433 814 A1, it is particularly preferred that a monomer having at least three radically polymerizable groups should be contained as the high-hardness monomer in an amount of at least 5% by weight based on the total of all other radically polymerizable monomers. Further typically, according to EP 1 433 814 A1, the radically polymerizable monomers include a radically polymerizable monomer having at least one epoxy group and at least one radically polymerizable group in the molecule besides the mentioned monomers classified by hardness. The durability of a photochromic compound and the adhesion of the photochromic coating can be improved by using the radically polymerizable monomer having at least one epoxy group. Radically polymerizable monomers having at least one epoxy group and at least one radically polymerizable group in the molecule are disclosed in EP 1 433 814 A1, page 13, paragraph [0101], to page 14, paragraph [0105]. According to EP 1 433 814 A1, the amount of the radically polymerizable monomer having at least one epoxy group and at least one radically polymerizable group in the molecule is typically, 0.01 to 30% by weight, particularly typically, 0.1 to 20% by weight based on the total of all other radically polymerizable monomers. The coating precursor material described in EP 1 433 814 A1 comprises at least one amine compound in an amount of 0.01 to 20 parts by weight based on 100 parts by weight of the total of all the radically polymerizable monomers in addition to the above mentioned radically polymerizable monomers. Examples for the at least one amine compound is given in EP 1 433 814 A1, page 14, paragraph [0108], to page 15, paragraph [0112]. The coating precursor material disclosed in EP 1 433 814 A1 comprises at least one photochromic compound in an amount of 0.01 to 20 parts by weight, typically, 0.05 to 15 parts by weight and more typically, 0.1 to 10 parts by weight based on 100 parts by weight of the total of all radically polymerizable monomers. Examples for photochromic compounds are given in EP 1 433 814 A1, page 15, paragraph [0114], to page 20, paragraph [0122].

EP 1 602 479 A1, in particular EP 1 602 479 A1, claim 9, discloses a coating precursor material comprising 100 parts by weight of a radically polymerizable monomer, 0.001 to 5 parts by weight of a silicone base or fluorine base surfactant and 0.01 to 20 parts by weight of a photochromic compound. According to EP 1 602 479 A1, the coating precursor material comprises a radically polymerizable monomer having a silanol group or a group which forms a silanol group by hydrolysis, an amine compound and a photochromic compound. The use amount of the radically polymerizable monomer having a silanol group or a group which forms a silanol group by hydrolysis is suitably 0.5 to 20% by weight, particularly 1 to 10% by weight based on the total weight of the whole coating agents. Other radically polymerizable monomers which according to EP 1 602 479 A1 can be used together with the radically polymerizable monomer having a silanol group or a group which forms a silanol group by hydrolysis, such as for example trimethylolpropane trimethacrylate, trimethylolpropane triacrylate, tetramethylolmethane trimethacrylate, tetramethylolmethane triacrylate, trimethylolpropane triethylene glycol triacrylate, pentaerythritol tetramethacrylate, dipentaerythritol hexaacrylate, urethane oligomer tetraacrylate, urethane oligomer hexamethacrylate, urethane oligomer hexaacrylate, polyester oligomer hexaacrylate, diethyleneglycol dimethacrylate, triethyleneglycol dimethacrylate, tetraethyleneglycol dimethacrylate, tripropireneglycol dimethacrylate, bisphenol A dimethacrylate, 2,2-bis(4-methacryloyloxyethoxydiphenyl) propane, glycidyl methacrylate, 2,2-bis(4-acryloyloxypolyethylene glycol phenyl)propane having an average molecular weight of 776 or methyl ether polyethylene glycol methacrylate having an average molecular weight of 475. The use amount of the other radically polymerizable monomers is suitably 20 to 90% by weight, particularly 40 to 80% by weight based on the weight of the whole coating agents. The use amount of the amine compound, such as triethanolamine, N-methyldiethanolamine, triisopropanolamine, N,N-dimethylaminoethyl methacrylate or N,N-diethylaminoethyl methacrylate for example, is suitably 0.01 to 15% by weight, particularly 0.1 to 10% by weight based on the weight of the whole coating agents. The use amount of the photochromic compound such as a naphthopyran derivative, a chromene derivative, a spirooxazine derivative, a spiropyran derivative or a fulgimide derivative is suitably 0.1 to 30% by weight, particularly 1 to 10% by weight based on the weight of the whole coating agents.

Typically, the drying and hardening and/or curing and/or sintering using at least one electromagnetic pulse does not only convert at least one photochromic coating precursor material into at least one photochromic coating, but also converts at least one coating precursor material into at least one coating when the uncoated or precoated optical lens substrate comprises at least one photochromic precursor material and/or at least one photochromic coating. This conversion of the at least one coating precursor material into at least one coating typically, does not damage at least one photochromic coating already applied to at least one surface of an uncoated or precoated optical lens substrate. The recipes to convert the at least one coating precursor material into at least one coating is typically, selected that it the transfer of energy occurs only on the layers over and under the photochromic coating and the photochromic coating is only minimally or not at all further affect by the at least single electromagnetic pulse. For example, the photochromic coating is cured by ultraviolet wavelength of the electromagnetic spectrum and further exposure to ultraviolet wavelength of the electromagnetic spectrum may damage one or more properties of the photochromic coating. In this example, the tuned wavelength for drying and hardening and/or curing and/or sintering using at least one electromagnetic pulse is used so that it applied sufficient dose to convert at least one coating precursor material into at least one coating without damaging the photochromic coating.

Further typically, the drying and hardening and/or curing and/or sintering using at least one electromagnetic pulse converts at least one photochromic coating precursor material into at least one photochromic coating and simultaneously at least one coating precursor material into at least one coating. The at least one photochromic precursor material and the at least one coating precursor material may be applied to the identical surface of the uncoated or precoated optical lens substrate or to opposite surfaces thereof. typically, the front surface of the uncoated or precoated optical lens substrate comprises the at least one photochromic precursor material.

Typically, the total process duration is not extended and typically, is a range from 100 µs to 10 min, further typically, from 300 µs to 7 min, more typically, from 500 µs to 5 min and most typically, from 1 ms to 3 min.

The front surface is according to DIN EN ISO 13666:2019-12 the surface of the lens intended to be fitted away from the eye. The back surface is according to DIN EN ISO 13666:2019-12 the surface of the lens intended to be fitted nearer to the eye.

At least one of the above-mentioned coating precursor materials may be applied to an uncoated or precoated optical lens substrate. typically, at least one primer coating precursor material resulting in at least one primer coating is applied to an uncoated or precoated optical lens substrate, followed by at least one hard coating precursor material resulting in at least one hard coating, the hard coating being the outermost layer in this coating sequence.

The expression "coating" or "layer" means the dried and cured and/or hardened and/or sintered coating precursor material, which has been applied to at least one surface of the optical lens substrate. With the at least one coating, the properties of the coated lens, typically, the mechanical and/or optical and/or functional properties, may be improved or altered.

The coated lens may further comprise at least one antireflective coating. The at least one antireflective coating typically, comprises alternating discrete metal oxide, metal hydroxide and/or metal oxide hydrate layers composed of or comprising aluminum, silicon, zirconium, titanium, yttrium, tantalum, neodymium, lanthanum, niobium and/or praseodymium. The at least one antireflective coating typically, comprises at least one layer of a metal oxide, metal hydroxide and/or metal oxide hydrate layer composed of or comprising silicon, which typically, forms the outermost layer of the antireflective coating. The antireflective coating typically, comprises a coating stack of at least one layer with a high refractive index (HRI) and of at least one layer with a low refractive index (LRI). There is no limitation for the number of layers. However, from the perspective of broadband reflection reduction, the layer total number in the antireflective coating is typically, higher than or equal to 3, further typically, higher than or equal to 5, and lower than or equal to 9. typically, the HRI layers have a physical thickness ranging from 10 to 120 nm and the LRI layers have a physical thickness ranging from 10 to 100 nm. The at least one antireflective coating typically, has a total layer thickness from a range from 100 nm to 1000 nm, typically, from a range from 110 nm to 800 nm, further typically, from a range from 120 nm to 750 nm, more typically, from a range from 130 nm to 700 nm and most typically, from a range from 140 nm to 500 nm. The at least one antireflective coating may be designed with respect to the desired optical properties thereof typically, by using the software OptiLayer, version 12.37, of company OptiLayer GmbH, 85748 Garching b. München, or the software Essential MacLeod, version 11.00.541, of company Thin Film Center Inc., 2745 E Via Rotunda, Tucson, AZ USA. For designing the at least one antireflective coating, the respective refractive indices of the layer materials typically, are assumed to be wavelength dependent. In case the antireflective coating comprises at least one layer of $SiO_2$ and at least one layer of $TiO_2$, the designing the antireflective coating typically, is based on a refractive index for $TiO_2$ of n=2.420 at 550 nm and a refractive index for $SiO_2$ of n=1.468 at 550 nm.

The at least one antireflective coating may comprise the layer sequence and the layer thickness indicated in EP 2 437 084 A1, in FIGS. 3 and 5, in each case between the superhydrophobic layer and the hard lacquer layer or the layer sequence and the layer thicknesses disclosed in paragraph of EP 2 801 846 A1.

In a coated lens comprising at least one hard coating and at least one antireflective coating, the at least antireflective coating typically, forms the outermost coating. In one exemplary embodiment, the coated lens may comprise at least one electrically conductive or semiconductive layer. The at least one electrically conductive or semiconductive layer may comprise, for example, a layer composed of or comprising indium tin oxide (($In_2O_3)_{0.9}$ $(SnO_2)_{0.1}$; ITO), fluorine tin oxide ($SnO_2$:F; FTO), aluminum zinc oxide (ZnO:Al; AZO) and/or antimony tin oxide ($SnO_2$:Sb; ATO). typically, the electrically conductive or semiconductive layer comprises a layer composed of or comprising ITO or composed of or comprising FTO. An electrically conductive or semiconductive layer arranged as the outermost layer of the coated lens on the object side or eye side reduces or avoids the static charging of the spectacle lens. This in turn facilitates the cleaning of the coated lens. The at least one electrically conductive or semiconductive layer may be one of the layers of the antireflective coating.

Typically, the at least one antireflective coating is manufactured by physical vapor deposition, typically, by means of electron beam evaporation or thermal evaporation in a vacuum chamber.

The coated lens further may comprise at least one clean coat layer, the at least one clean coat layer being the outermost coating in the layer sequence of the coating. The at least one clean coat layer may have oleophobic or hydrophobic properties, as disclosed for example in EP 1 392 613 A1, wherein water forms a contact angle of more than 90°, typically, of more than 100° and particularly of more than 110°. The at least one clean coat layer may comprise for example at least one fluoro organic layer covalently bonding to the underneath adjacent layer as disclosed in DE 198 48 591 A1, claim 1, or at least one layer based on perfluoropolyethers. The at least one clean coat layer may be a hydrophobic coating, typically, physical vapor deposited layer, which ensures that the spectacle lens having an easy to clean surface. Typical contaminations on the surface of a coated lens could be easily removed by liquid droplets, typically, water droplets, just rolling off or rolling of in combination with wiping. The hydrophobic coating comprises typically, a silane having at least one fluorine-containing group, which exhibits typically, more than 20 carbon atoms. Per- or polyfluoroalkyl compounds (PEAS) with silane functionality that comprise at least one —$(CF_2)_x$— units ($x \geq 1$) are commonly used.

Summarizing, the exemplary embodiments of the following clauses are particularly typical within the scope of the present disclosure:

Clause 1: Method for manufacturing a coated lens comprising at least one uncoated or precoated optical lens substrate and at least one coating, wherein the method comprises at least the following steps, typically, in the given order: providing at least one uncoated or precoated optical lens substrate comprising a front surface and a back surface, applying at least one coating precursor material to at least one of the surfaces of the uncoated or precoated optical lens substrate, applying at least one single electromagnetic pulse to uncoated or precoated optical lens substrate comprising the at least one coating precursor material resulting in the conversion of the at least one coating precursor material into the at least one coating.

Clause 2: Method according to clause 1, wherein the at least one coating precursor material is dried and hardened and/or cured and/or sintered by application of at least one single electromagnetic pulse.

Clause 3: Method according to any of the previous clauses, wherein the at least one coating precursor material does not comprise a photoinitiator.

Clause 4: Method according to any of the previous clauses, wherein the at least one coating precursor material is at least one selected from the group consisting of at least one hard coating precursor material, at least one primer coating precursor material and at least photochromic coating precursor material.

Clause 5: Method according to any of the previous clauses, wherein the total process duration for the conversion of the at least one coating precursor material into the at least one coating is within a range from 100 μs to 10 min, further typically, from 300 μs to 7 min, more typically, from 500 μs to 5 min and most typically, from 1 ms to 3 min.

Clause 6: Method according to any one of the previous clauses, wherein the total process duration for the conversion of at least one coating precursor material, the at least one coating precursor material being at least one selected from the group consisting of at least one primer coating precursor material, at least one hard coating precursor material and at least one photochromic coating precursor material, into at least one coating, the at least one coating being at least one selected from the group consisting of at least one primer coating, at least one hard coating and at least one photochromic coating, by an indirect drying and hardening and/or curing and/or sintering using at least one single electromagnetic pulse is reduced by at least 50%, typically, in a range from 60% to 99.99%, further typically, in a range from 70% to 99.5%, more typically, in a range from 80% to 99% and most typically, in a range from 90% to 98.5%, each as compared to total process duration for a conventional thermal curing process using direct heating, typically, below or at the threshold temperature of the uncoated or precoated optical lens substrate, to achieve the identical target values of at least one mechanical and/or at least one optical and/or at least one functional property each of the coated lens.

Clause 7: Method according to any one of the previous clauses, wherein the achievable target values for at least one mechanical property and/or at least one optical property and/or at least one functional property of a coated lens are increased by a factor of up to 1000%, typically, by a factor in a range from 5% to 900%, further typically, by a factor in a range from 10% to 800%, more typically, by a factor in a range from 15% to 700% and most typically, by a factor in a range from 20% to 600%, each as compared to the achievable target values for at least one mechanical property and/or at least one optical property and/or at least one functional property of a coated lens thermally dried and thermally hardened and/or thermally cured and/or thermally sintered by the direct application of heat, wherein, before drying and hardening and/or curing and/or sintering the coated lenses comprise the identical uncoated or precoated optical lens substrate and the identical at least one coating precursor material.

Clause 8: Method according to any one of the previous clauses, wherein the uncoated or precoated optical lens substrate comprises at least one coating precursor material on the front surface thereof and at least one coating precursor material on the back surface thereof.

Clause 9: Method according to any one of the previous clauses, wherein the uncoated or precoated optical lens substrate comprises at least two coating precursor materials on one surface thereof and optionally at least one coating precursor material on the opposite surface of the uncoated or the precoated optical lens substrate.

Clause 10: Method according to any one of the previous clauses, wherein the uncoated or precoated optical lens substrate comprises at least two coating precursor materials on one surface, typically, the front surface, thereof and optionally at least two coating precursor materials on the opposite surface, typically, the back surface, of the uncoated or precoated optical lens substrate, wherein the at least two coating precursor materials applied to the identical surface of the uncoated or precoated optical lens substrate are different from each other.

Clause 11: Method according to clause 10, wherein the at least two coating precursor materials applied to one of the surfaces of the uncoated or precoated optical lens substrate are identical to or different from the at least two coating precursor materials applied to the respective opposite surface of the uncoated or precoated optical lens substrate.

Clause 12: Method according to any one of clauses 10 or 11, wherein the at least two coating precursor materials on the front surface of the uncoated or precoated optical lens substrate are at least two selected from the group consisting of at least one primer coating precursor material, at least one hard coating precursor material and at least one photochromic coating precursor material, and the at least two coating precursor materials on the back surface of the uncoated or precoated optical lens substrate are at least two selected from the group consisting of at least one primer coating precursor material, at least one hard coating precursor material and at least one photochromic precursor material.

Clause 13: Method according to any one of the previous clauses, wherein the target value for at least one mechanical property and/or for at least one optical property and/or for at least one functional property each of the coated lens is adjustable or tunable or modifiable in range from 1% to 1000%, typically, in a range from 2% to 900%, further typically, from 3% to 850%, more typically, from 4% to 800% and most typically, from 5% to 750%, each based on a given target value.

Clause 14: Method according to any one of the previous clauses, wherein the at least one coating precursor material is selected from at least one of the group consisting of at least one primer coating precursor material and at least one hard coating precursor material.

Clause 15: Method according to any one of the previous clauses, wherein the uncoated or precoated optical lens substrate comprises at least one photochromic coating.

Clause 16: Method according to any one of the previous clauses, wherein the uncoated or precoated optical lens substrate comprises on at least one surface thereof at least one photochromic coating, optionally at least one primer coating precursor material and at least one hard coating precursor material, typically, the identical surface of the uncoated or precoated optical lens substrate comprises the at least one photochromic coating, the optional at least one primer coating material and the at least one hard coating precursor material, further typically, the at least one hard coating precursor material being the outermost material thereof.

Clause 17: Method according to any one of the previous clauses, wherein the uncoated or precoated optical lens substrate comprises on at least one surface thereof at least one primer coating and at least one hard coating precursor material, the at least one hard coating material typically, being the outermost material thereof.

Clause 18: Method according to any one of the previous clauses, wherein the at least one hard coating precursor material comprises at least
- A)a) at least one silane derivative of the formula (I) $Si(OR^1)(OR^2)(OR^3)(OR^4)$, wherein $R^1$, $R^2$, $R^3$ and $R^4$, which may be the same or different, are selected from an alkyl, an acyl, an alkyleneacyl, a cycloalkyl, an aryl or an alkylenearyl group, each of which may optionally be substituted, and/or
  - b) at least one hydrolysis product of the at least one silane derivative of the formula (I), and/or
  - c) at least one condensation product of the at least one silane derivative of the formula (I), and/or
  - e) any mixture of the components a) to c) thereof
- B)a) at least one silane derivative of the formula (II) $R^6R^7_{3-n}Si(OR^5)_n$, in which $R^5$ is selected from an alkyl, an acyl, an alkyleneacyl, a cycloalkyl, an aryl or an alkylenearyl group, each of which may optionally be substituted, $R^6$ is an organic radical containing an epoxide group, $R^7$ is selected from an alkyl, a cycloalkyl, an aryl or an alkylenearyl group, each of which may optionally be substituted, n is 2 or 3; and/or
  - b) at least one hydrolysis product of the at least one silane derivative of the formula (II), and/or
  - c) at least one condensation product of the at least one silane derivative of the formula (II), and/or
  - e) any mixture of the components a) to c) thereof
- C) at least one colloidal inorganic oxide, hydroxide, oxide hydrate, fluoride and/or oxyfluoride;
- D) at least one epoxide compound having at least two epoxide groups; and
- E) at least one catalyst system comprising at least one Lewis acid and at least one thermolatent Lewis acid-base adduct.

Clause 19: Method according to any one of the preceding clauses, wherein the at least one primer coating precursor material comprises at least
- i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion, at least one aqueous aliphatic, cycloaliphatic, aromatic or heteroaromatic polyester dispersion, typically, at least one aqueous aliphatic polyurethane dispersion or at least one aqueous aliphatic polyester dispersion and more typically, at least one aqueous aliphatic polyurethane dispersion,
- ii) at least one solvent,
- v) at least one base, and
- vi) optionally at least one additive.

Clause 20: Method according to any one of the previous clauses, wherein the target value for at least one mechanical property and/or for at least one optical property and/or for at least one functional property each of the coated lens is adjustable in range from 1% to 1000%, compared to the lower or upper limit of an achievable target value.

Clause 21: Method according to any one of the previous clauses, wherein the uncoated or precoated optical lens substrate comprises on at least one surface thereof at least one photochromic coating, optical at least one primer coating precursor material and at least one hard coating precursor material, the functional property of the coated lens, in particular the time to darken and/or fade back to a transmittance level of at least 70%, is tunable within a range from 0.5% to 200%, typically, from 1% to 150%, more typically, from 5% to 100%.

EXAMPLES

I Manufacture of Coated Lenses According to the Examples and Comparative Examples Example 1

An uncoated optical lens substrate based on polyallyl-diglycol carbonate (0 dpt, diameter: 75 mm), coated on both surfaces with the hard coating precursor material according to example 2 of EP 2 578 649 A1 together with the primer precursor material according to example 1 of U.S. Pat. No. 5,316,791, was first dried with an IR lamp for 5 minutes at 70° C. in ambient air. Subsequently, the front surface was exposed to an electromagnetic pulse train consisting of 60 electromagnetic pulses within a total process duration of 42 seconds in ambient air. The wavelength of each single electromagnetic pulse was between 200 nm to 1000 nm. Each of the 60 electromagnetic pulses delivered a dose of 5.8 J/cm². Each of the 60 electromagnetic pulses were divided into 12 micro-pulses at an average duty-cycle of 14%. The envelope of each of the 60 electromagnetic pulses was 126 ms.

Example 2

The coated lens of Example 1 was further coated with an anti-reflective coating according to EP 2 801 846 A1, paragraph [0056].

Comparative Example 1

An optical lens substrate based on polyallyldiglycol carbonate (0 dpt, diameter: 75 mm), coated on both surfaces with the hard coating precursor material according to example 2 of EP 2 578 649 A1 together with the primer precursor material according to example 1 of U.S. Pat. No. 5,316,791, was first dried with an IR lamp for 5 minutes at 70° C. in ambient air. Subsequently, it was cured at 110° C. for 30 minutes in ambient air.

Comparative Example 2

The coated lens of comparative example 1 was further coated with an anti-reflective coating according to EP 2 801 846 A1, paragraph [0056].

Example 3

An optical lens substrate based on polyallyldiglycol carbonate (0 dpt, diameter: 75 mm), coated on both surfaces with the hard coating precursor material according to example 2 of EP 2 578 649 A1 together with the primer precursor material according to example 1 of U.S. Pat. No. 5,316,791, was first dried with an IR lamp for 5 minutes at 70° C. in ambient air. Subsequently, the front surface was exposed to an electromagnetic pulse train consisting of 45 electromagnetic pulses within a total process duration of 42 seconds in ambient air. The wavelength of each single electromagnetic pulse was between 200 nm to 1000 nm. Each of the 45 electromagnetic pulses delivered a dose of 7.5 J/cm$^2$. Each of the 45 electromagnetic pulses were divided into 8 micro-pulses at an average duty-cycle of 30%. The envelope of each of the 45 electromagnetic pulses was 90 ms.

Example 4

The coated lens of Example 3 was further coated with an anti-reflective coating according to EP 2 801 846 A1, paragraph [0056].

Comparative Example 3

An optical lens substrate based on polyallyldiglycol carbonate (0 dpt, diameter: 75 mm), coated on both surfaces with the hard coating precursor material according to example 2 of EP 2 578 649 A1 together with the primer precursor material according to example 1 of U.S. Pat. No. 5,316,791, was first dried with an IR lamp for 5 minutes at 70° C. in ambient air. Subsequently, it was cured at 110° C. for 50 seconds in ambient air.

Example 5

An optical lens substrate based on polyallyldiglycol carbonate absorbing light up to 400 nm wavelength (0 dpt, diameter: 75 mm) with a photochromic layer on the front surface, coated on both surfaces with the hard coating precursor material according to example 2 of EP 2 578 649 A1 together with the primer precursor material according to example 1 of U.S. Pat. No. 5,316,791, was first dried with an IR lamp for 5 minutes at 70° C. in ambient air. Subsequently, the front surface was exposed to an electromagnetic pulse train consisting of 50 electromagnetic pulses within a total process duration of 38 seconds in ambient air. An additional UV-filter was used to so that wavelength of each single electromagnetic pulse was between 420 nm to 1000 nm. Each of the 50 electromagnetic pulses delivered a dose of 3.2 J/cm$^2$. Each of the 50 electromagnetic pulses were divided into 4 micro-pulses at an average duty-cycle of 95%. The envelope of each of the 45 electromagnetic pulses was 74 ms.

Comparative Example 4

An optical lens substrate based on polyallyldiglycol carbonate absorbing light up to 400 nm wavelength (0 dpt, diameter: 75 mm) with a photochromic layer on the front surface, coated on both surfaces with the hard coating precursor material according to example 2 of EP 2 578 649 A1 together with the primer precursor material according to example 1 of U.S. Pat. No. 5,316,791, was first dried with an IR lamp for 5 minutes at 70° C. in ambient air. Subsequently, it was cured at 110° C. for 30 minutes in ambient air.

Example 6

An optical lens substrate based on polyallyldiglycol carbonate absorbing light up to 365 nm wavelength (0 dpt, diameter: 75 mm) with a photochromic layer on the front surface, coated on both surfaces with the hard coating precursor material according to example 2 of EP 2 578 649 A1 together with the primer precursor material according to example 1 of U.S. Pat. No. 5,316,791, was first dried with an IR lamp for 5 minutes at 70° C. in ambient air. Subsequently, the front surface was exposed to an electromagnetic pulse train consisting of 50 electromagnetic pulses within a total process duration of 38 seconds in ambient air. The wavelength of each single electromagnetic pulse was between 200 nm to 1000 nm. Each of the 50 electromagnetic pulses delivered a dose of 3.2 J/cm$^2$. Each of the 50 electromagnetic pulses were divided into 4 micro-pulses at an average duty-cycle of 95%. The envelope of each of the 45 electromagnetic pulses was 74 ms.

Example 7

An optical lens substrate based on polyallyldiglycol carbonate absorbing light up to at 365 nm wavelength (0 dpt, diameter: 75 mm) with a photochromic layer on the front surface, coated on both surfaces with the hard coating precursor material according to example 2 of EP 2 578 649 A1 together with the primer precursor material according to example 1 of U.S. Pat. No. 5,316,791, was first dried with an IR lamp for 5 minutes at 70° C. in ambient air. Subsequently, the front surface was exposed to an electromagnetic pulse train consisting of 40 electromagnetic pulses within a total process duration of 36 seconds in ambient air. An additional UV-filter was used to so that wavelength of each single electromagnetic pulse was between 420 nm to 1000 nm. Each of the 40 electromagnetic pulses delivered a dose of 3.67 J/cm$^2$. Each of the 40 electromagnetic pulses were divided into 4 micro-pulses at an average duty-cycle of 95%. The envelope of each of the 40 electromagnetic pulses was 74 ms.

Comparative Example 5

An optical lens substrate based on polyallyldiglycol carbonate absorbing light up to at 365 nm wavelength (0 dpt, diameter: 75 mm) with a photochromic layer on the front surface, coated on both surfaces with the hard coating precursor material according to example 2 of EP 2 578 649 A1 together with the primer precursor material according to example 1 of U.S. Pat. No. 5,316,791, was first dried with an IR lamp for 5 minutes at 70° C. in ambient air. Subsequently, it was cured at 110° C. for 30 minutes in ambient air.

Example 8

An optical lens substrate based on polyallyldiglycol carbonate (0 dpt, diameter: 75 mm), coated on both surfaces with the hard coating precursor material according to example 2 of EP 2 578 649 A1, was first dried with an IR lamp for 5 minutes at 70° C. in ambient air. Subsequently, the front surface was exposed to an electromagnetic pulse train consisting of 25 electromagnetic pulses within a total process duration of 25 seconds in ambient air. An additional UV-filter was used to so that wavelength of each single electromagnetic pulse was between 420 nm to 1000 nm. Each of the 25 electromagnetic pulses delivered a dose of 10.2 J/cm$^2$. Each of the 25 electromagnetic pulses were divided into 12 micro-pulses at an average duty-cycle of 14%. The envelope of each of the 25 electromagnetic pulses was 105 ms.

Example 9

An optical lens substrate based on polyallyldiglycol carbonate (0 dpt, diameter: 75 mm), coated on both surfaces with the hard coating precursor material according to example 2 of EP 2 578 649 A1, was first dried with an IR lamp for 5 minutes at 70° C. in ambient air. Subsequently, the front surface was exposed to an electromagnetic pulse train consisting of 65 electromagnetic pulses within a total process duration of 38 seconds in ambient air. An additional UV-filter was used to so that wavelength of each single electromagnetic pulse was between 420 nm to 1000 nm. Each of the 65 electromagnetic pulses delivered a dose of 5.1 J/cm$^2$. Each of the 25 electromagnetic pulses were divided into 10 micro-pulses at an average duty-cycle of 14%. The envelope of each of the 65 electromagnetic pulses was 105 ms.

Example 10

An optical lens substrate based on polyallyldiglycol carbonate (0 dpt, diameter: 75 mm), coated on both surfaces with the hard coating precursor material according to example 2 of EP 2 578 649 A1, was first dried with an IR lamp for 5 minutes at 70° C. in ambient air. Subsequently, the front surface was exposed to an electromagnetic pulse train consisting of 75 electromagnetic pulses within a total process duration of 75 seconds in ambient air. An additional UV-filter was used to so that wavelength of each single electromagnetic pulse was between 420 nm to 1000 nm. Each of the 75 electromagnetic pulses delivered a dose of 10.2 J/cm$^2$. Each of the 75 electromagnetic pulses were divided into 12 micro-pulses at an average duty-cycle of 14%. The envelope of each of the 75 electromagnetic pulses was 105 ms.

Example 11

An optical lens substrate based on polyallyldiglycol carbonate (0 dpt, diameter: 75 mm), coated on both surfaces with the hard coating precursor material according to example 2 of EP 2 578 649 A1, was first dried with an IR lamp for 5 minutes at 70° C. in ambient air. Subsequently, the front surface was exposed to an electromagnetic pulse train consisting of 25 electromagnetic pulses within a total process duration of 25 seconds in ambient air. The wavelength of each single electromagnetic pulse was between 200 nm to 1000 nm. Each of the 25 electromagnetic pulses delivered a dose of 13.3 J/cm$^2$. Each of the 25 electromagnetic pulses were divided into 12 micro-pulses at an average duty-cycle of 14%. The envelope of each of the 25 electromagnetic pulses was 105 ms.

Example 12

An optical lens substrate based on polyallyldiglycol carbonate (0 dpt, diameter: 75 mm), coated on both surfaces with the hard coating precursor material according to example 2 of EP 2 578 649 A1, was first dried with an IR lamp for 5 minutes at 70° C. in ambient air. Subsequently, the front surface was exposed to an electromagnetic pulse train consisting of 40 electromagnetic pulses within a total process duration of 40 seconds in ambient air. The wavelength of each single electromagnetic pulse was between 200 nm to 1000 nm. Each of the 25 electromagnetic pulses delivered a dose of 13.3 J/cm$^2$. Each of the 40 electromagnetic pulses were divided into 12 micro-pulses at an average duty-cycle of 14%. The envelope of each of the 40 electromagnetic pulses was 105 ms.

Comparative Example 6

An optical lens substrate based on polyallyldiglycol carbonate (0 dpt, diameter: 75 mm), coated on both surfaces with the hard coating precursor material according to example 2 of EP 2 578 649 A1, was first dried with an IR lamp for 5 minutes at 70° C. in ambient air. Subsequently, it was cured at 110° C. for 30 minutes in ambient air.

Comparative Example 7

An optical lens substrate based on polyallyldiglycol carbonate (0 dpt, diameter: 75 mm), coated on both surfaces with the hard coating precursor material according to example 2 of EP 2 578 649 A1, was first dried with an IR lamp for 5 minutes at 70° C. in ambient air. Subsequently, it was cured at 110° C. for 1 hour in ambient air.

Example 13

An optical lens substrate based on polythiourethane (MR8, Mitsui Chemicals, 0 dpt, diameter: 75 mm), coated on both surfaces with the hard coating precursor material according to example 1 of U.S. Pat. No. 5,366,545, was first dried with an IR lamp for 5 minutes at 70° C. in ambient air. Subsequently, the front surface was exposed to an electromagnetic pulse train consisting of 75 electromagnetic pulses within a total process duration of 136 seconds in ambient air. The wavelength of each single electromagnetic pulse was between 200 nm to 1000 nm. Each of the 25 electromagnetic pulses delivered a dose of 5.8 J/cm$^2$. Each of the 75 electromagnetic pulses were divided into 12 micro-pulses at an average duty-cycle of 14%. The envelope of each of the 75 electromagnetic pulses was 125 ms.

Comparative Example 8

An optical lens substrate based on polythiourethane (MR8, Mitsui Chemicals, 0 dpt, diameter: 75 mm), coated on both surfaces with the hard coating precursor material according to example 1 of U.S. Pat. No. 5,366,545, was first dried with an IR lamp for 5 minutes at 70° C. in ambient air. Subsequently, it was cured at 110° C. for 1 hour in ambient air.

Example 14

An uncoated optical lens substrate based on polyallyldiglycol carbonate (0 dpt, diameter: 75 mm), coated on both surfaces with the hard coating precursor material according to example 2 of EP 2 578 649 A1 together with the primer precursor material according to example 1 of U.S. Pat. No. 5,316,791, was first dried with an IR lamp for 5 minutes at 70° C. in ambient air. Subsequently, the front surface was exposed to an electromagnetic pulse train in a in a batch process or in a continuous process consisting of 65 overlapping electromagnetic pulses within a 75 mm length at a speed of 0.107 m/min, leading to a total process duration of 42 seconds in ambient air for the lens of 75 mm diameter. The wavelength of each single electromagnetic pulse was between 200 nm to 1000 nm. Each of the 65 electromagnetic pulses delivered a dose of 5.8 J/cm2. Each of the 65 electromagnetic pulses were divided into 12 micro-pulses at an average duty-cycle of 14%. The envelope of each of the 65 electromagnetic pulses was 126 ms.

II Characterization of the Coated Lenses According to the Examples and Comparative Examples IIa Determination of the Indentation Hardness For the determination of the indentation hardness of the coating of the spectacle lenses according to the examples and comparative examples, a diamante indenter with a conic tip of 2 µm±0.2 µm radius and a cone of 90°±1.5° was pressed into the surface of the coating of the spectacle lenses according to the examples and comparative examples while both penetration depth and normal load were monitored. The indentation hardness was obtained from the force-displacement curve according to manufacturer specifications. The corresponding results are shown in table 1 to table 6 below. The indentation hardness has been determined with the Ultra Nanoindentation Tester $UNHT^3$, company Anton Paar GmbH.

IIb Determination of the Scratch Resistance

For the determination of the scratch resistance of the coating of the spectacle lenses according the examples and comparative examples, the Bayer ratio was determined according to the COLTS operating procedure. A small pan loaded with a spectacle lens according to the examples or comparative examples as well as loaded with an uncoated diethylene glycol bisallylcarbonate spectacle lens (CR-39 lens) is shaken back and forth a distance of 4 inches, at 150 cycles per minute for 4 minutes. Holes that have been placed across the center section of the pan allow the spectacle lenses to protrude up through the center of each hole, resulting in abrasion in the presence of Kryptonite B as abrasion media. The spectacle lens according to the examples or comparative examples and the CR-39 lens had a hazemeter measurement completed prior to abrasion and another following abrasion. The resulting haze gain of the spectacle lens according to the examples and comparative examples is divided into the resulting haze of the CR-39 lens to establish a ratio of how many more times abrasion resistant the spectacle lens according to the examples or comparative examples is compared to the CR-39 lens. The Bayer ratio R is defined as R=Dstd/Dtest, with Dstd being the final % haze value of the CR-39 lens minus the initial % haze value of the CR-39 lens and Dtest being the final % haze value of the spectacle lens according to the examples or comparative examples minus the initial % haze value of the spectacle lens according to the examples and comparative examples. The haze-gard plus, company BYK-Gardner GmbH, was used for haze measurement.

The higher the Bayer ratio of a coating, the more scratch resistant is the coating. A coating having a Bayer ratio of 1 means that the coating has the same scratch resistance as the CR-39 lens. The Bayer ratios of the spectacle lenses according to the examples and comparative examples are given in table 1 and table 2 below.

IIc Determination of the Adhesion

For the determination of the adhesion of the coating of the spectacle lenses according to the examples or comparative examples the cross-cut test was done, using a blade to cut through the coating to the substrate. At least two cuts are made that intersect at 90 degrees to get a right angle lattice pattern. The adhesive tape Scotch 600, company 3M, was applied to and removed from the lattice pattern. The cross-cut area was visually examined for any adhesion failure with the naked eye according to the catalogue "QC solutions for coatings and plastics 2018", BYK-Gardner, page 158:

0 means that the edges of the cuts were completely smooth, none of the squares of the lattices were detached;

1 means that at the intersections of the cuts small flakes were detached, a cross-cut area not significantly greater than 5% was affected;

2 means that the coating has been flaked along the edges and/or at the intersections of the cuts, a cross-cut area significantly greater than 5%, but not significantly greater than 15% was affected;

3 means that the coating has been flaked along the edges of the cuts partly or wholly in large ribbons and/or it has been flaked partly or wholly on different parts of the squares, a cross-cut area greater than 15%, but not significantly greater than to 35% was affected;

4 means that the coating has been flaked along the edges of the cuts in large ribbons and/or some squares have been detached partly or wholly, a cross-cut area significantly greater than 35%, but not significantly greater than 65% was affected; and 5 means that any degree of flaking that could not even be classified by classification 4.

The results of the cross-cut test according to the examples and comparative examples are given in sections IIIa, IIIb and IIIf below.

IId Determination of the Chemical Composition

For the determination of chemical composition of the coating, X-ray photoelectron spectroscopy (XPS) was done using the Axis Ultra DLD system which gave the elemental distribution of the coated lens. The results of the chemical composition according to the examples and comparative examples are given in table 7 below.

IIe Determination of the Transmittance:

For the determination of transmittance, a PerkinElmer Lambda 950S double-beam scanning spectrophotometer was used. The results of the transmittance according to the examples and comparative examples are given in table 1 to table 6 below.

IIf Determination of Clarity

For the determination of the small angle scattering (clarity) light is diffused in a small cone with high concentration. The see-through quality needs to be determined in an angle range smaller than 2.5 degrees. The small angle scattering is determined according to the now withdrawn DIN EN ISO 167:1995, section 4.2, in a radius ranging from 1 mm to 3 mm from the geometric center of the coated lens. The results of the clarity according to the examples and comparative examples are given in table 1 and table 2 below.

IIg Determination of Yellowing

The yellowing of coated lenses of the examples and comparative examples was determined according to DIN 6167 and has been calculated from the standard colour values X, Y, Z according to G=[(aX−bY)/Y]·100, with a=1,301 and b=1,149 (standard illuminant D65, standard observer 10°). The results of the yellowing according to the examples and comparative examples are given in table 1 to table 4 below.

IIh Determination of Fading Back Time for Photochromic Lenses

For the determination of fading back time of the coated lenses comprising a photochromic coating, a photochromic rig, was used. Fading back time to 70% transmittance is the time required by the coated lens to relax to 70% transmittance after 15 minutes of darkening. The results of the fading back time according to the examples and comparative examples are given in table 5 and table 6 below.

III. Results

IIIa. A Reduction of the Total Process Duration:

Comparing the mechanical properties, in particular indentation hardness, of the coated lens of example 1 with the coated lens of comparative example 1, the almost same target value was obtained in 42 seconds in example 1 instead of 30 minutes in comparative example 1 (Table 1). This is a 97.6% reduction in the total process duration for curing the identical coating precursor material.

Comparing the mechanical properties, in particular scratch resistance, and the optical properties, in particular the optical transmittance, yellowing and clarity, of the coated lens of example 2 with the coated lens of comparative example 2, the almost same target values were obtained for each of these properties (Table 1).

The target values in examples 1 and 2 and comparative examples 1 and 2 was to obtain indentation hardness values above 600 MPa, Bayer ratio after anti-reflective coating above 12, optical transmittance after anti-reflective coating above 95%, yellowing after anti-reflective coating below 7, and clarity after anti-reflective coating below 0.02 cd/m 2/lx.

Comparing the mechanical properties, in particular indentation hardness, of the coated lens of example 14 with the coated lens of example 1 and comparative example 1, the almost same target value was obtained in 42 seconds in a continuous process with a speed of 0.107 m/min.

The cross-cut test for adhesion for the coated lens in examples 1, 2, 14 and comparative examples 1 and 2 was done on both sides and a value of 0 was obtained. The results confirm that there was no adhesion failure on both front and back surfaces of the dip-coated lenses after curing and simultaneous curing takes places on both surfaces coated with two coating precursor materials.

TABLE 1

Comparison of optical and mechanical properties of examples 1 and 2, and comparative examples 1 and 2.

| | Mechanical property | Optical Property | | | | |
|---|---|---|---|---|---|---|
| | Indentation hardness MPa | Bayer ratio | Transmittance % | Yellowing | Clarity cd/m$^2$/ lx | Total process duration[1] |
| Example 1 | 654 | — | — | — | — | 42 sec |
| Example 2 | — | 12.2 | 95.5 | 5.65 | 0.011 | 42 sec |
| Comparative Example 1 | 653 | — | — | — | — | 30 min |
| Comparative Example 2 | — | 12.5 | 95.5 | 5.09 | 0.011 | 30 min |

[1]Total process duration for drying and hardening and/or curing and/or sintering the hard coating precursor material only IIIb. Increase in Indentation Hardness and Improved Bayer Ratio of Coating:

The recipe in example 3 resulted in improved mechanical properties of the coated lenses, in particular indentation hardness and Bayer ratio. The coated lens of example 3 when compared with the comparative example 1, has 30% increase of the indentation hardness. (Table 2) This improvement in mechanical property happens in a process duration of 50 seconds which is much lower than process duration of 30 minutes in comparative example 1. When compared with a comparative example 3, where the process time is the same as example 3, the indentation hardness is increased by 300%. Therefore, a dramatic improvement in mechanical properties is seen in example 3 while the process duration remains many folds lower for curing the identical coating precursor material.

Comparing the mechanical properties, in particular scratch resistance, and the optical properties, in particular the optical transmittance, yellowing and clarity, of the coated lens of example 4 with the coated lens of comparative example 2, the almost same target values of were obtained for each of the optical properties while the Bayer ratio is substantially improved (Table 2).

The target values in examples 3 and 4 and comparative examples 1, 2, and 3 was to obtain indentation hardness values above 600 MPa, Bayer ratio after anti-reflective coating above 12, optical transmittance after anti-reflective coating above 95%, yellowing after anti-reflective coating below 7, and clarity after anti-reflective coating below 0.02 cd/m 2/lx. The comparative example 3 does not reach this target confirming the insufficient total process during in this case.

The cross-cut test for adhesion for the coated lens in example 3, comparative examples 1 and comparative example 3 was done on both sides and compared. A value of 0 was obtained in example 3 and comparative example 3 confirming that there was no adhesion failure on both front and back surfaces of the dip-coated lenses after curing and simultaneous curing takes places on both surfaces. Further, the value of 2 for front surface and value of 3 for the back surface was obtained in case of comparative example 3 which confirms an adhesion failure and that the coating has been flaked along the edges of the cuts. In addition, this also confirms that a 50 second time is insufficient to achieve curing in an oven in case of comparative example 3 while both surfaces in example 3 are sufficiently cured within this 50 second time frame, resulting in indentation values even higher than the target values obtain in example 4 with a total process duration of 30 minutes.

TABLE 2

Comparison of optical and mechanical properties of examples 3 and 4 and comparative examples 1, 2 and 3.

| | Mechanical property | Optical Property | | | |
|---|---|---|---|---|---|
| | Indentation hardness MPa | Bayer ratio | Trans- mittance % | Yellow- ing | Clarity cd/m$^2$/ lx | Total process duration[1] |
| Example 3 | 850 | — | — | — | — | 50 sec |
| Example 4 | — | 14.3 | 95.4 | 6.66 | 0.012 | 50 sec |
| Comparative Example 1 | 653 | — | — | — | — | 30 min |
| Comparative Example 2 | — | 12.5 | 95.5 | 5.09 | 0.011 | 30 min |
| Comparative Example 3 | 250 | — | — | — | — | 50 sec |

[1]Total process duration for drying and hardening and/or curing and/or sintering the hard coating precursor material only IIIc. Improved Optical Property and Faster Photochromic Performance of a Coated Lens:

Comparing the mechanical properties, in particular indentation hardness, and optical properties, in particular the transmittance and yellowing, and functional properties, in particular time to fade back a transmittance level of to 70% from the activated state, of the coated lens of example 5 with the coated lens of comparative example 4, the almost same target value of hardness was obtained in 38 seconds in example 5 instead of 30 minutes in comparative example 4 (Table 3). This is a 97.89% reduction in the total process duration for curing the identical coating precursor material.

In addition, tuning of the recipe in example 5 resulted in a much-improved optical and functional properties of the coated lenses when compared to the comparative example 4 (Table 3). The optical properties, in particular, the transmittance, clarity and yellowing are all lower. This improves the cosmetic of the photochromic coated lenses. The functional property, in particular the time to fade back to transmittance level of 70%, is also reduced from 286 seconds down to 271 seconds. The reduction in time is a substantial improvement in the performance of photochromic materials attributed to selectively filtering out light from wavelengths below 420 nm which transfers almost negligible amount of dose to the photochromic material during the curing process.

The target values in examples 5 and comparative examples 4 was to obtain indentation hardness values above 300 MPa, optical transmittance above 85%, yellowing after anti-reflective coating below 7, and clarity after anti-reflective coating below 0.02 cd/m$^2$/lx.

TABLE 3

Comparison of mechanical properties, optical properties and photochromic properties of example 5 and comparative example 4.

| | Mechanical property | Optical Property | | | | Photochromic performance Time to fade back to 70% | |
|---|---|---|---|---|---|---|---|
| | Indentation hardness MPa | Trans- mittance % | Yellow- ing | Clarity cd/m$^2$/lx | trans- mittance (sec) | Total process duration[1] |
| Example 5 | 327 | 86.5 | 5.91 | 0.007 | 271 | 38 sec |
| Comparative Example 4 | 376 | 86.1 | 6.13 | 0.01 | 286 | 30 min |

[1]Total process duration for drying and hardening and/or curing and/or sintering the hard coating precursor material only IIId. Photochromic Coated Lens with Optimal Transmittance and High Degree of Tunability of Mechanical Property.

Comparing the mechanical properties, in particular indentation hardness, and optical properties, in particular the transmittance and yellowing, and functional properties, in particular time to fade back a transmittance level of to 70% from the activated state, of the coated lens of example 6 and 7 with the coated lens of comparative example 5, the almost same target value of transmittance of above 88% was obtained in all cases (Table 4).

In addition, almost the same values of yellowing and time to fade back to transmittance level of 70% were obtained compared to comparative example 5 but improved values of indentation hardness. The total process took in 38 seconds in example 7 instead of 30 minutes in comparative example 5 (Table 4). This is a 98% reduction in the total process duration for curing the identical coating precursor material. As in case of example 5, the use of a UV-filter did not affect the photochromic material which is sensitive to exposure with UV light.

The indentation hardness was further improved by 21.33% in example 6 compared to example 7 while maintaining target values of transmittance above 88% and almost the same total process time. Exposure was done with an electromagnetic pulse from 200 nm wavelength to 1000 nm wavelength in example 6 and from 420 nm wavelength to 1000 nm wavelength in example 7. The indentation hardness here in 26.38% higher than comparative example 5 while the total process time is much lower. Further comparing example 6 and example 7, the time to fade back to 70% transmittance level is lower and the yellowing is higher in example 6. This confirms that the bigger bandwidth of electromagnetic spectrum, specifically wavelength from 200 nm to 420 nm, slow down the photochromic performance by over-curing the photochromic coating and increasing the yellowing of the coated lens.

TABLE 4

Comparison of optical and mechanical properties of examples 6 and 7 and comparative example 5.

| | Mechanical property | Optical Property | | Photochromic performance Time to fade | |
|---|---|---|---|---|---|
| | Indentation hardness MPa | Transmittance % | Yellowing | back to 70% trans-mittance (sec) | Total process duration[1] |
| Example 6 | 455 | 88.1 | 8.44 | 196 | 38 sec |
| Example 7 | 375 | 88.6 | 5.98 | 176 | 36 sec |
| Comparative Example 5 | 360 | 88.5 | 5.92 | 177 | 30 min |

[1]Total process duration drying and hardening and/or curing and/or sintering the hard coating precursor material only IIIe. High Degree of Tunability and Higher Extreme Values of Mechanical and Optical Property.

Comparing the mechanical properties, in particular indentation hardness, and optical properties, in particular the transmittance of the coated lens of example 8 to 11 with the coated lens of comparative example 6 and 7, a high degree of tunability and higher extreme values of indentation hardness values was seen when exposure was done with the electromagnetic pulse train in examples 7 to 11 while maintaining the transmittance above 95% as in the case comparative examples 6 and 7 (Table 5).

Further, it was seen that indentation hardness values of comparative example 6 and 7 remains almost the same even after doubling the total process duration from 30 minutes to 1 hour. The value remains close to 650 MPa indicating a higher limit and small range of values that can be obtained. On the other hand, it was seen in example 12 that a much higher extreme value of 863 MPa was obtained in 40 seconds while the transmittance value is the same as comparative example 6 and 7. With further tuning the electromagnetic pulse train, smaller values can be obtained either with the same dose as in example 11 or by reducing the dose as in example 10. The resulting coating in example 10 and 11 are both above the target values of 500 MPa while it is possible in example 11 to have better optical properties (e.g., higher transmittance) compared to example 10, comparative example 6 or comparative example 7. This also confirm a large tunability range of mechanical properties, in this case the transmittance. Further, a further reduction of indentation hardness values was obtained in example 8 and 9 where a shorter range of wavelength of the electromagnetic pulse train was used. In both examples 8 and example 9, similar value of indentation hardness was obtained with half the dose in example 9 compared to example 8 even the total process time was only slightly higher in example 9. The electromagnetic pulse train in example 9 was tuned such that the a much higher transmittance value of 95.7% was possible while maintaining the same indentation hardness values as in example 8. This observation again confirmed a high degree of tunability and higher extreme values of mechanical and optical property using at least a single electromagnetic pulse.

TABLE 5

Comparison of optical and mechanical properties of examples 8 to 13 with comparative example 6 and 7.

| | Mechanical property Indentation hardness MPa | Optical Property Transmittance % | Total process duration[1] |
|---|---|---|---|
| Example 8 | 201 | 95.5 | 25 sec |
| Example 9 | 203 | 95.7 | 38 sec |
| Example 10 | 518 | 95.5 | 75 sec |
| Example 11 | 605 | 95.3 | 25 sec |
| Example 12 | 863 | 95.2 | 40 sec |
| Comparative Example 6 | 655 | 95.2 | 30 min |
| Comparative Example 7 | 651 | 95.2 | 60 min |

[1]Total process duration for drying and hardening and/or curing and/or sintering the hard coating precursor material only IIIf. Tunability and Modification of Tint Absorption or Uptake in a Hard-Coating.

Comparing the functional properties, in particular tint absorption or uptake, and mechanical properties, in particular the indentation hardness of the coated lens of example 13 and comparative example 8 revealed a high degree of tunability and modification of the capacity of tint absorption or uptake in the hard-coating while maintaining the target value of indentation hardness above 500 MPa (Table 6). Cured hard-coating does not have any substantial tint absorption or uptake as seen in the value of 1.689% in comparative example 8 and this value decreases as the indentation hardness value increase. Only an uncoated polythiourethane substrate has substantial tint uptake of 5.674% (Table 6). The coated lens obtained after curing with the electromagnetic pulse train in example 13 has a very high tint uptake of 7.437% even though the indentation hardness is also very high. This confirms a modification of the coating, for example different porosity or surface roughness, resulting in tuning of the tint uptake of the coated lens in example 13.

The cross-cut test for adhesion for the coated lens in example 13 and comparative example 8 was done on both sides. A value of 0 was obtained in example 13 as well as in comparative example 8 confirming that there was no adhesion failure on both front and back surfaces of the coated lens and simultaneous curing takes places on both surfaces.

TABLE 6

Comparison of tint uptake of examples 13, comparative example 8 and an uncoated substrate.

| | Indentation hardness (MPa) | Transmittance (%) | | Percentage of tint uptake or percentage reduction in transmittance (%) |
|---|---|---|---|---|
| Example 13 | 625 | Before tint | 96.14 | 7.437 |
| | | After tint | 88.99 | |
| Comparative example 8 | 550 | Before tint | 95.92 | 1.689 |
| | | After tint | 94.3 | |
| Uncoated substrate | | Before tint | 95.87 | 5.674 |
| | | After tint | 90.43 | |

IIIg. Tunability and Modification of Chemical Composition.

Comparing the functional properties, in particular the chemical composition of the coated lens of example 13 and comparative example 8 revealed a and modification of the chemical composition of the coated lens. XPS showed clear difference in chemical composition (Table 7) and chemical bonding. The example 13 shows higher percentage of elemental oxygen, higher percentage of elemental silicon, higher percentage of elemental oxygen, higher percentage of elemental fluorine, and substantially lower percentage of elemental carbon. In addition, the chemical bonding of silicon and fluorine was also different in example 13 compared to comparative example 8.

TABLE 7

Comparison of chemical composition of examples 13 and comparative example 8.

| Element | Percentage composition in XPS | |
|---|---|---|
| | Example 13 | Comparative example 8 |
| O | 39.9 | 37.1 |
| C | 42.4 | 47.3 |
| Si | 17 | 15 |
| F | 0.5 | 0.2 |

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A method for manufacturing of a coated lens, the method comprising at least the steps of:
applying at least one coating precursor material to at least one surface of an uncoated or precoated optical lens substrate; and
applying at least one single electromagnetic pulse to an optical lens substrate having the at least one coating precursor material to dry and to harden and/or to sinter and/or to cure the at least one coating precursor material for converting the at least one coating precursor material into at least one coating,
wherein
within a range for a total process duration needed for drying and hardening and/or sintering and/or curing the at least one coating precursor material selected from the group of ranges consisting of:
from 100 us to 10 min,
from 300 us to 7 min,
from 500 us to 5 min,
from 1 ms to 3 min,
at least one mechanical property and/or at least one optical property and/or at least one functional property of the coated lens is adjusted to meet a given requirement for at least one of the properties or to obtain a specific target value for at least one of the properties,
wherein the given requirement for the at least one of the properties is met or the specific target value for the at least one of the properties is obtained during the total process duration needed for drying and hardening and/or sintering and/or curing the at least one coating precursor material.

2. The method according to claim 1, wherein
the at least one mechanical property of the coated lens is adjusted by selecting between different target values for the mechanical property, and/or
the at least one optical property of the coated lens is adjusted by selecting between different target values for the optical property, and/or
the at least one functional property of the coated lens is adjusted by selecting between different target values for the functional property.

3. The method according to claim 1, wherein the mechanical property is selected from the group consisting of indentation hardness, scratch resistance, adhesion, delamination, crazing and water uptake of the optical lens substrate,
wherein the optical property is selected from the group consisting of transmittance, absorbance and reflectance, preferably, from wavelengths ranging from 300 nm to 780 nm, clarity, and yellowing,
wherein the functional property is selected from the group consisting of control of the surface wetting, the photochromic performance, the surface cleanability, tint absorption or uptake, the surface tension and the chemical composition,
each of the coated lens.

4. The method according to claim 1, wherein the selection of the target value is performed by changing at least one process parameter within a recipe or by changing a combination of process parameters within a recipe.

5. The method according to claim 1, wherein the at least one coating precursor material is at least one selected from the group consisting of at least one primer coating precursor material, at least one hard coating precursor material and at least one photochromic coating precursor material.

6. The method according to claim 1, wherein the at least one coating precursor material does not comprise a photoinitiator.

7. The method according to claim 1, wherein the at least one hard coating precursor material comprises
A) a) at least one silane derivative of the formula (III) $R^1R^2_{3-n}Si(OR^3)_n$, wherein $R^1$ comprises an alkyl group, a cyclo alkyl group, an acyl group, an aryl group or an hetero aryl group, each of which may be substituted, $R^2$ is an organic rest comprising an epoxide group, $R^3$ comprises an alkyl group, a cyclo alkyl group, an aryl group or a hetero aryl group, each of which may be substituted, n=2 or 3, and/or
b) at least one hydrolysis product of the silane derivative of the formula (III), and/or
c) at least one condensation product of the silane derivative of the formula (III), and/or
d) any mixture of components a) to c);
B) at least one colloidal inorganic oxide, hydroxide, oxide hydrate, fluoride and/or oxyfluoride;
C) at least one epoxy component comprising at least two epoxy groups; and
D) at least one catalyst system comprising at least one Lewis acid and at least one thermolatent Lewis base-adduct.

8. The method according to claim 1, wherein the at least one primer coating precursor material comprises
   i) at least one aqueous aliphatic, cycloaliphatic, aromatic or heteroaromatic polyurethane dispersion, at least one aqueous aliphatic, cycloaliphatic, aromatic or heteroaromatic polyurea dispersion, at least one aqueous aliphatic, cycloaliphatic, aromatic or heteroaromatic polyurethane-polyurea dispersion, at least one aqueous aliphatic, cycloaliphatic, aromatic or heteroaromatic polyester dispersion,
   ii) at least one solvent, and
   iii) optionally, at least one additive.

9. The method according to claim 8, wherein the at least one primer coating precursor material comprises the at least one aqueous aliphatic polyurethane dispersion or the at least one aqueous aliphatic polyester dispersion.

10. The method according to claim 8, wherein the at least one primer coating precursor material comprises the at least one aqueous aliphatic polyurethane dispersion.

11. A method for manufacturing of a coated lens, the method comprising at least the steps of
   applying at least one coating precursor material to at least one surface of an uncoated or precoated optical lens substrate,
   drying and hardening and/or sintering and/or curing the at least one coating precursor material by applying at least one single electromagnetic pulse to an optical lens substrate having the coating precursor material to convert the at least one coating precursor material into at least one coating,
wherein
at least one mechanical property and/or at least one optical property and/or at least one functional property each of the coated lens is adjusted based on a recipe used for the conversion of the at least one coating precursor material into at least one coating, the recipe being a selection of a plurality of process parameters which are simultaneously or sequentially used to meet a requirement or to obtain a target value of exact one mechanical property and/or exact one optical property and/or exact one functional property.

12. The method according to claim 11, wherein the process parameters are selected of at least one from the group consisting of the wavelength of light used, the number of single electromagnetic pulses in an electromagnetic pulse train, the peak intensity of the at least one single electromagnetic pulse, the total process duration, the total dose delivered by the at least one single electromagnetic pulse, the number of micro-pulses within a one single electromagnetic pulse, the average duty cycle, the duration of the envelope, and the total number of repetitions of the at least one single electromagnetic pulse.

13. The method according to claim 12, wherein changing the process parameters within a recipe, or changing the combination of process parameters within a recipe, or changing at least one process parameter within a recipe each result in a variation of the target value of the mechanical property, and/or the target value of the optical property, and/or the target value of the functional property.

14. A method for manufacturing a coated lens, the coated lens comprising an uncoated or precoated optical lens substrate and at least one coating, the method comprising the following steps:
   a) providing at least one uncoated or precoated optical lens substrate having a front surface and a back surface, the optical lens substrate having a first transmittance within a wavelength range A,
   b) applying at least one coating precursor material to at least one of the surfaces of the uncoated or precoated optical lens substrate, the coating precursor material having a second transmittance within a wavelength range B,
   c) applying at least one single electromagnetic pulse to the at least one surface of the uncoated or precoated optical lens substrate having the at least one coating precursor material resulting in the coated lens, the single electromagnetic pulse having a wavelength range C,
   wherein
      the wavelength range B of the second transmittance encompasses the wavelength range A of the first transmittance,
      the wavelength range C of the single electromagnetic pulse encompasses the wavelength range A of the first transmittance and the wavelength range B of the second transmittance,
      in the wavelength range A, the single electromagnetic pulse passes through the optical lens substrate and the coating precursor material,
      in the wavelength range B, the single electromagnetic pulse passes through the coating precursor material,
      in the wavelength range C not encompassing the wavelength range A, the part of the single electromagnetic pulse of the remaining wavelength C is at least partially absorbed by the optical lens substrate.

15. The method according to claim 14, wherein the at least one optical lens substrate is selected from the group consisting of
   a plano clear optical lens substrate or a corrective clear optical lens substrate, each having a transmittance of at least 70% in the wavelength range A of from 200 nm to 1100 nm; or
   a plano tinted optical lens substrate or a corrective tinted optical lens substrate, each having a transmittance in a range of from 10% to 90% in the wavelength range A of from 200 nm to 1100 nm.

16. The method according to claim 14, wherein the at least one coating precursor material has a transmittance of at least 75% in the wavelength range B of from 100 nm to 1100 nm.

17. The method according to claim 14, wherein the at least one single electromagnetic pulse has a wavelength ranging from 100 nm to 1100 nm.

18. The method according to claim 14, wherein in step c) the at least one single electromagnetic pulse is applied for a total process duration of a range of from 50 μs to 3 min.

19. The method according to claim 14, wherein in step c) the at least one single electromagnetic pulse is applied according to a recipe comprising at least one process parameter selected from the group consisting of the wavelength of each single electromagnetic pulse, the total dose delivered by at least one single electromagnetic pulse, the number of micro-pulses within a one single electromagnetic pulse, the average duty cycle, and the total number of repetitions of the at least one single electromagnetic pulse.

20. The method according to claim 14, wherein the resulting coated lens exhibits
   at least one mechanical property and/or
   at least one optical property and/or
   at least one functional property,
each property having at least one target value.

21. The method according to claim 20, wherein the at least one target value is adjustable by changing at least one of the process parameters of the recipe.

22. The method according to claim 20, wherein the at least one target value for at least one mechanical property and/or for the at least one optical property and/or for the at least one functional property, each of the coated lens is adjustable in a range from 1% to 1000%, based on a given target value.

23. The method according to claim 20, wherein the at least one target value for at least one mechanical property and/or at least one optical property and/or at least one functional property of the coated lens is higher or lower in a range from 1 time to 275 times as compared to the highest or lowest achievable target value for the respective property of a coated lens obtained by applying heat below the threshold temperature of the uncoated or precoated optical lens substrate.

24. The method according to claim 14, the coated lens comprising an uncoated or precoated optical lens substrate and at least one coating, the method comprising the following steps:
   a) providing at least one uncoated or precoated optical lens substrate having a front surface and a back surface, the optical lens substrate having a transparency in a wavelength range of from 400 nm to 800 nm,
   b) applying at least one coating precursor material to at least one of the surfaces of the uncoated or precoated optical lens substrate, the coating precursor material having a transparency in a wavelength range of from 100 nm to 1100 nm,
   c) irradiating the at least one surface of the uncoated or precoated optical lens substrate having the at least one coating precursor material with at least one single electromagnetic pulse for a total process duration resulting in the coated lens, the single electromagnetic pulse having a wavelength range of 100 nm to 1100 nm, wherein
   the total process duration is in a range of from 50 μs to 20 min,
   in a wavelength range of from 400 nm to 800 nm, the at least one single electromagnetic pulse passes through the optical lens substrate with minimal or no absorption and through the coating precursor material with minimal or no absorption,
   in a wavelength range of from 100 nm to <400 nm and in a wavelength range of from >800 nm to 1100 nm, the single electromagnetic pulse is absorbed by the optical lens substrate with a transmittance of <80% and passes through the coating precursor material.

25. The method according to claim 24, wherein the total process duration is in a range of from 100 μs to 3 min.

* * * * *